(12) United States Patent
Murugesan et al.

(10) Patent No.: US 12,143,410 B1
(45) Date of Patent: Nov. 12, 2024

(54) INCREMENTAL CLOUD INFRASTRUCTURE DETECTION FOR DATA SECURITY POSTURE MANAGEMENT

(71) Applicant: Normalyze, Inc., Los Altos, CA (US)

(72) Inventors: Mummoorthy Murugesan, Gilroy, CA (US); Vivek Jeyakumar, San Jose, CA (US); Ravishankar Ganesh Ithal, Los Altos, CA (US)

(73) Assignee: Normalyze, Inc., Los Altos, CA (US)

( * ) Notice: Subject to any disclaimer, the term of this patent is extended or adjusted under 35 U.S.C. 154(b) by 0 days.

(21) Appl. No.: 18/376,584

(22) Filed: Oct. 4, 2023

(30) Foreign Application Priority Data

Jul. 28, 2023 (IN) .............................. 202311051057

(51) Int. Cl.
*H04L 9/40* (2022.01)
(52) U.S. Cl.
CPC .......... *H04L 63/1425* (2013.01); *H04L 63/20* (2013.01)
(58) Field of Classification Search
CPC .......................... H04L 63/1425; H04L 63/20
USPC ............................................................ 726/1
See application file for complete search history.

(56) References Cited

U.S. PATENT DOCUMENTS

| 2021/0133301 A1* | 5/2021 | Chen | G06F 21/316 |
| 2023/0008173 A1* | 1/2023 | Crabtree | G06F 16/951 |

* cited by examiner

*Primary Examiner* — Anthony D Brown
(74) *Attorney, Agent, or Firm* — Flagship Patents; Sikander M. Khan; Chris Volkmann

(57) ABSTRACT

The technology disclosed relates to analysis of security posture of a cloud environment. In particular, the disclosed technology relates to a system and method for analysis of infrastructure posture of a cloud environment, that include detecting a triggering criterion corresponding to initiation of an update scan of the infrastructure posture of the cloud environment, and invoking an incremental change detector based on the triggering criterion. The incremental change detector is configured to scan the cloud environment and return a scan result that identifies one or more changes to a set of infrastructure assets in the cloud environment within a selected time period. A cloud infrastructure graph is updated based on the one or more changes to the set of infrastructure assets, wherein the cloud infrastructure graph defines nodes that represent resources in the cloud environment and edges, between the nodes, that represent relationships between the resources.

18 Claims, 19 Drawing Sheets

Risk Signatures

| Name | Signature id | Description | Result Header | Resource | Tags | Likelihood Factor | Impact Factor |
|---|---|---|---|---|---|---|---|
| s3_bucket_mfa_deletion_not_enabled | 3017 | S3 Bucket's MFA delete is disabled | account_id account_name bucket_id +6 | bucket_arn | aws s3 | 7 | |
| s3_bucket_not_enable_transfer_acceleration | 3022 | S3 Bucket's transfer acceleration is disabled | account_id account_name bucket_id +6 | bucket_arn | aws s3 configuration_check | 3 | |
| s3_bucket_granting_write_access_to_all_authenticated_users | 3026 | S3 Bucket's grants WRITE (Upload/Delete) access to all authenti... | account_id account_name bucket_id +6 | bucket_arn | aws s3 iam | 10 | |
| s3_bucket_server_side_encryption_not_enabled | 3013 | S3 Bucket's default encryption is not enabled | account_id account_name bucket_id +6 | bucket_arn | aws s3 GDPR | 7 | |
| s3_bucket_name_not_dns_compliant | 3012 | S3 Bucket's name is not DNS compliant | account_id account_name bucket_id +6 | bucket_arn | aws s3 | 3 | |
| s3_bucket_not_enable_object_lock | 3021 | S3 Bucket's object lock is not enabled | account_id account_name bucket_id +6 | bucket_arn | aws s3 | 3 | |
| iam_password_policy_with_minimal_length_less_than_14_having_access_to_sensitive_data | 2534 | IAM User's password policy does not require minimal length o... | account_id account_name bucket_id +8 | bucket_arn | aws iam | 10 | 10 |

1-30 of 230 items  < 1 2 3 4 5 ... 8 >  30 / page

Sidebar: Home, Visualization, Risks, Inventory, Data, Assets, Data Scan, Profiles, Entities, Scan Settings, Risk Investigation, Risk Signatures, Query Builder, Automation, Settings, Accounts, Api Keys, Team Management, Integrations

FIG. 13

INCREMENTAL CLOUD INFRASTRUCTURE DETECTION FOR DATA SECURITY POSTURE MANAGEMENT

CROSS-REFERENCE TO RELATED APPLICATION

The present application claims the benefit of Indian Application No. 202311051057, filed Jul. 28, 2023, the contents of which is hereby incorporated by reference in its entirety.

FIELD OF THE TECHNOLOGY DISCLOSED

The technology disclosed generally relates to cloud environments. More specifically, but not by limitation, the present disclosure relates to improved systems and methods of cloud security posture management (CSPM), cloud infrastructure entitlement management (CIEM), cloud-native application protection platform (CNAPP), cloud-native configuration management database (CMDB), and/or data security posture management (DSPM).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud computing provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

The technology disclosed relates to analysis of security posture of a cloud environment. In particular, the disclosed technology relates to a system and method for analysis of infrastructure posture of a cloud environment, that include detecting a triggering criterion corresponding to initiation of an update scan of the infrastructure posture of the cloud environment, and invoking an incremental change detector based on the triggering criterion. The incremental change detector is configured to scan the cloud environment and return a scan result that identifies one or more changes to a set of infrastructure assets in the cloud environment within a selected time period. A cloud infrastructure graph is updated based on the one or more changes to the set of infrastructure assets, wherein the cloud infrastructure graph defines nodes that represent resources in the cloud environment and edges, between the nodes, that represent relationships between the resources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 8-1 and 8-2 (collectively referred to as FIG. 8) provide a flow diagram illustrating one example of infrastructure analysis and query execution.

FIGS. 10-1 and 10-2 (collectively referred to as FIG. 10) provide a flow diagram of an example operation of infrastructure posture analysis using incremental change detection.

FIG. 13 illustrates one example of a user interface display that renders a set of tagged risk signatures.

DETAILED DESCRIPTION

Figure 1:
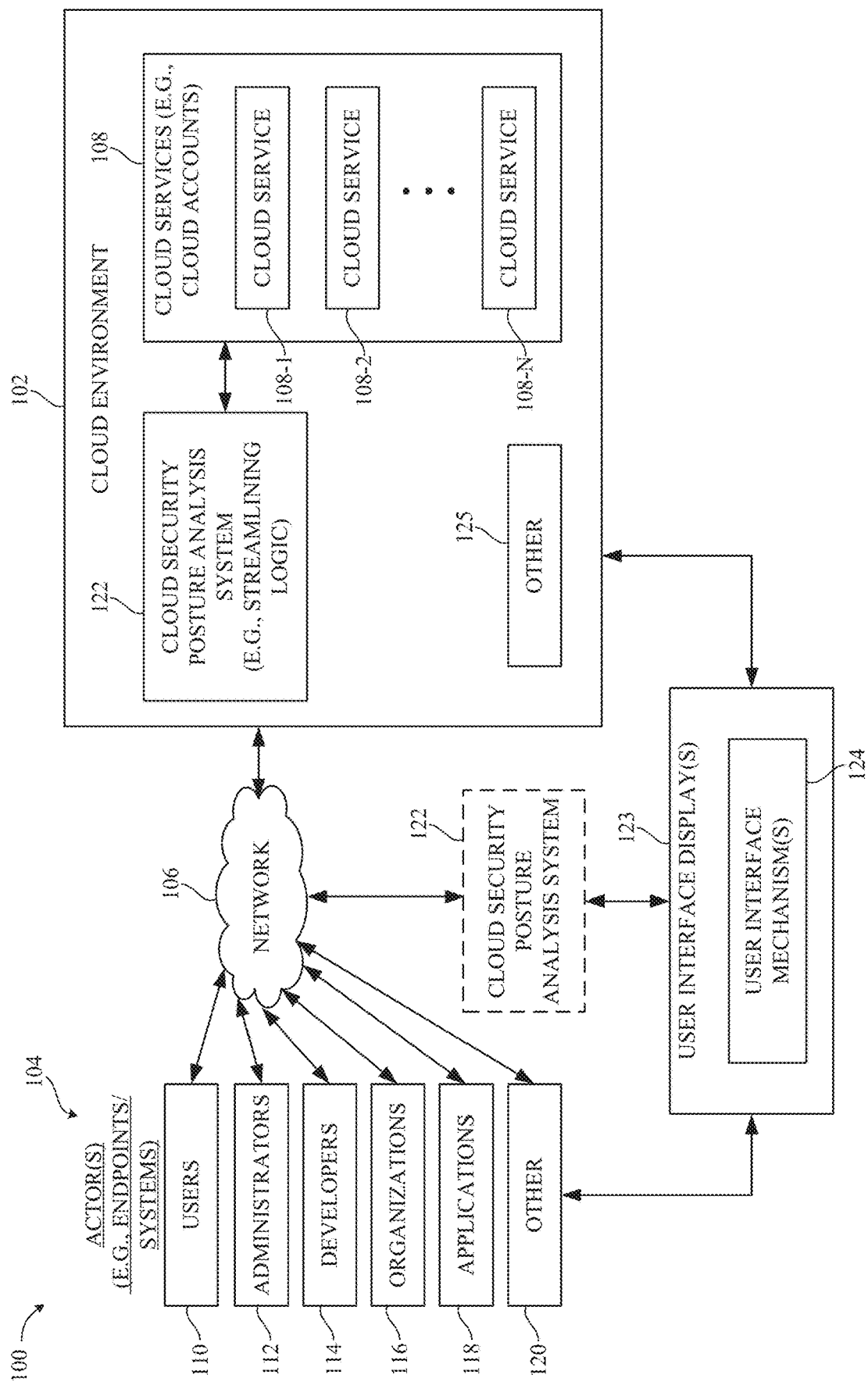
FIG. 1 is a block diagram illustrating one example of a cloud architecture.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, cloud computing environments are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

Cloud environments often include security infrastructure to enforce access control, data loss prevention, or other processes to secure data from potential vulnerabilities. However, even with such security infrastructures, it can be difficult for an organization to understand the data posture and breadth of access to the data stored in the cloud in the organization's cloud account. In other words, it can be difficult to identify which users have access to which data, and which data may be exposed to malicious or otherwise unauthorized users, both inside or outside the organization.

The present disclosure is directed to a cloud security posture analysis system configured to analyze a cloud infrastructure of a cloud environment relating to the security posture relating to cloud security posture. The system governs infrastructure assets within the cloud environment and generates a representation, such as a cloud infrastructure graph. Examples of infrastructure graph generation are described in U.S. patent application Ser. No. 17/858,907, filed Jul. 6, 2022, the contents on which are hereby incorporated by reference in their entirety.

One example of a cloud infrastructure graph includes a map or other graphical representation having nodes and edges representing cloud infrastructure assets and relationships between those assets. For example, the nodes can represent resources, such as compute resources and storage resources, and the edges can represent roles and/or privileges between those resources. Further, sensitive data among the resources and access patterns to the sensitive data can be utilized, for example to identify security vulnerabilities to understand the data security posture, detect and remedy the security vulnerabilities, and to prevent future breaches of sensitive data.

In many cases, a cloud environment can be relatively large, in that there are hundreds if not thousands (or more) of resources with many different roles and privileges that are utilized to access those resources. Analyzing such a cloud environment is very computationally expensive and requires a lot of processing bandwidth, for example during an ingestion stage (e.g. in which metadata is pulled into tables) and further post processing stages (such as traversing the tables/graph to find risks). Such post processing often takes many queries to the resources resulting in many service calls to various APIs. In some instances, this causes significant latency, resulting in the infrastructure graph and post processing to be based on stale or outdated data, thus resulting in inaccurate identification of potential vulnerabilities. Also, in some instances, the numerous queries and calls can result in errors, such as locking out the requestor and preventing further cloud data access and analysis.

The present disclosure describes an infrastructure detection and update system configured to incrementally scan the cloud infrastructure for changes and perform post processing that is constrained based on the changes. The incremental identification of these changes streamlines the infrastructure graph (or other representation) generation and post processing steps, resulting in reduced latency and more up-to-date, accurate data on which security vulnerability and remedial action steps can be based. This improves the cloud environment.

FIG. 1 is a block diagram illustrating one example of a cloud architecture 100 in which a cloud environment 102 is accessed by one or more actors 104 through a network 106, such as the Internet or other wide area network. Cloud environment 102 includes one or more cloud services 108-1, 108-2, 108-N, collectively referred to as cloud services 108. As noted above, cloud services 108 can include cloud storage services such as, but not limited to, AWS, GCP, Microsoft Azure, to name a few.

Further, cloud services 108-1, 108-2, 108-N can include the same type of cloud service, or can be different types of cloud services, and can be accessed by any of a number of different actors 104. For example, as illustrated in FIG. 1, actors 104 include users 110, administrators 112, developers 114, organizations 116, and/or applications 118. Of course, other actors 120 can access cloud environment 102 as well.

Architecture 100 includes a cloud security posture analysis system 122 configured to access cloud services 108 to identify and analyze cloud infrastructure and data security posture within cloud environment 102. Examples of system 122 are discussed in further detail below. Briefly, however, system 122 is configured to access cloud services 108 and identify cloud infrastructure assets, such as by identifying connected resources, entities, actors, etc. within those cloud services, and to identify risks and violations against access to sensitive information. As shown in FIG. 1, system 122 can reside within cloud environment 102 or outside cloud environment 102, as represented by the dashed box in FIG. 1. Of course, system 122 can be distributed across multiple items inside and/or outside cloud environment 102.

Users 110, administrators 112, developers 114, or any other actors 104, can interact with cloud environment 102 through user interface displays 123 having user interface mechanisms 124. For example, a user can interact with user interface displays 123 provided on a user device (such as a mobile device, a laptop computer, a desktop computer, etc.) either directly or over network 106. Cloud environment 102 can include other items 125 as well.

Figure 2:
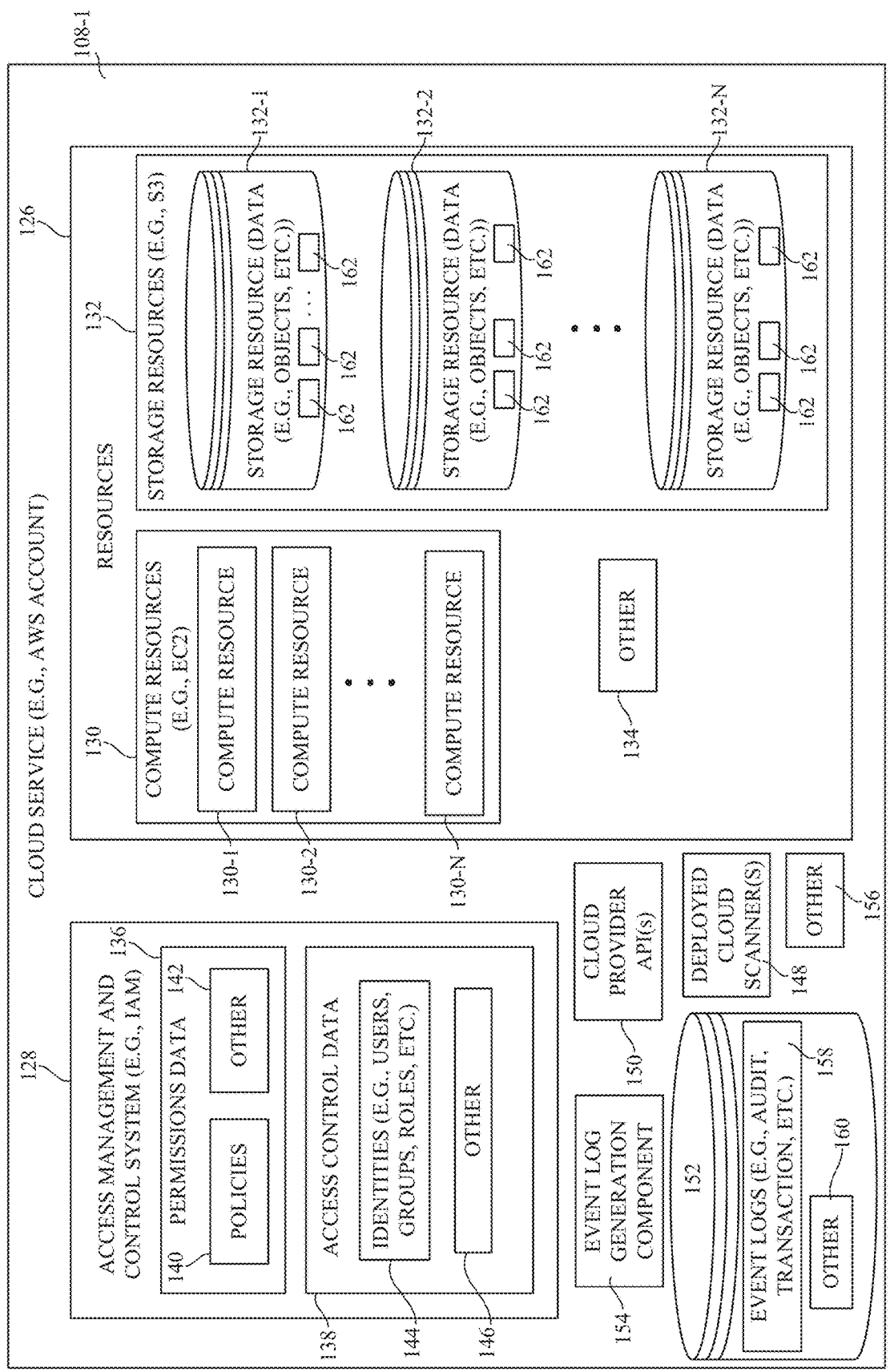
FIG. 2 is a block diagram illustrating one example of a cloud service.

FIG. 2 is a block diagram illustrating one example of cloud service 108-1. For the sake of the present discussion, but not by limitation, cloud service 108-1 will be discussed in the context of an account within AWS. Of course, other types of cloud services and providers are within the scope of the present disclosure.

Cloud service 108-1 includes a plurality of resources 126 and an access management and control system 128 configured to manage and control access to resources 126 by actors 104. Resources 126 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on permissions data 136 and/or access control data 138. System 128 illustratively includes identity and access management (IAM) functionality that controls access to cloud service 108-1 using entities (e.g., IAM entities) provided by the cloud computing platform.

Permissions data 136 includes policies 140 and can include other permissions data 142. Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by compute resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 108-1 includes one or more deployed cloud scanners 148, cloud provider application programming interface(s) (APIs) 150, a data store 152, an event log generation component 154, and can include other items 156 as well. Cloud scanner 148 run locally on the cloud-based services and the server systems, and can utilize elastic compute resources, such as, but not limited to, AWS Lambda resources. Cloud scanner 148 is configured to access and scan the cloud service 108-1 on which the scanner is deployed. Examples are discussed in further detail below. Briefly, however, a scanner accesses the data stored in storage resources 132, permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

Event log generation component 154 is configured to generate event logs 158 (also referred to as activity logs), which record actions taken by a user, a role, or a cloud service as events. Component 154, in one example, is configured to deploy a database log generator on each of a plurality of databases 162 on storage resources 132. Databases 162 can store information in any of a plurality of different types of structures. For example, some or all databases 162 can comprise structured query language (SQL) databases that store and organize data in tables with related information. Each table consists of rows and columns, with each row representing a record and each column representing a specific data field. SQL databases allow users to manipulate data through SQL commands. Some examples of SQL databases include MySQL and PostgreSQL, to name a few. Alternatively, or in addition, some or all databases 162 can include non-SQL databases.

The respective event log generator, for each respective database 162, generates a respective database log in event logs 158. An example log includes log entries that record the database activities, events, etc. Example logs include, but not limited to, audit logs, transaction logs, etc.

As noted above, in some examples, resources 126 can include AWS EC2 and/or Lambda resources. Also, resources 126 can include AWS Instance Stores and/or AWS Elastic Block Store (EBS) volumes. An EBS volume is a durable, block-level storage device that can attach to a compute instance and used as a physical hard drive.

Resources 126 can also include an Azure blob identified by a resource URL syntax that assigns each resource a corresponding base URL.

A cloud storage service or cloud service provider (CSP) can include an organization which hosts services such as networking, software, servers, and/or infrastructure, among others. A CSP can also provide security for the provided services. The services provided by the CSP can relieve a client organization of individual responsibility of setting and managing infrastructure. Examples of CSPs include Amazon Web Services™, Microsoft Azure™, Salesforce™, Google Cloud Platform™, among others.

Cloud provider APIs 150 are configured to receive calls to access various components in cloud service 108. For example, cloud provider APIs 150 can access event logs 158 stored in data store 152. Data store 152 can also store other data items 160 as well.

A CSP generally provides a number of different interfaces to cloud-computing services, such as a service-provider interface to organizational clients for computing services. A CSP, for example, provides interfaces that allow cloud-computing clients to launch virtual machines, application programs, and other computational entities. A CSP can also provide user interface that allow claims to access, through the Internet, the services provided by the CSP. A client of the CSP can deploy web servers to access, modify, and sending information.

A cloud account provided by a CSP includes roles that determine user privileges users and what actions can be taken in the cloud account. An identify and access management (IAM) role is managed by the CSP and provides predefined roles that give granular access to specific CSP resources and prevent unwanted access to other CSP resources. For instance, an AWS IAM role includes an AWS identity with a set of permissions policies that each determine what the role can do within an AWS account. An IAM role can be assumed by anyone who needs requires the role.

Figure 3:
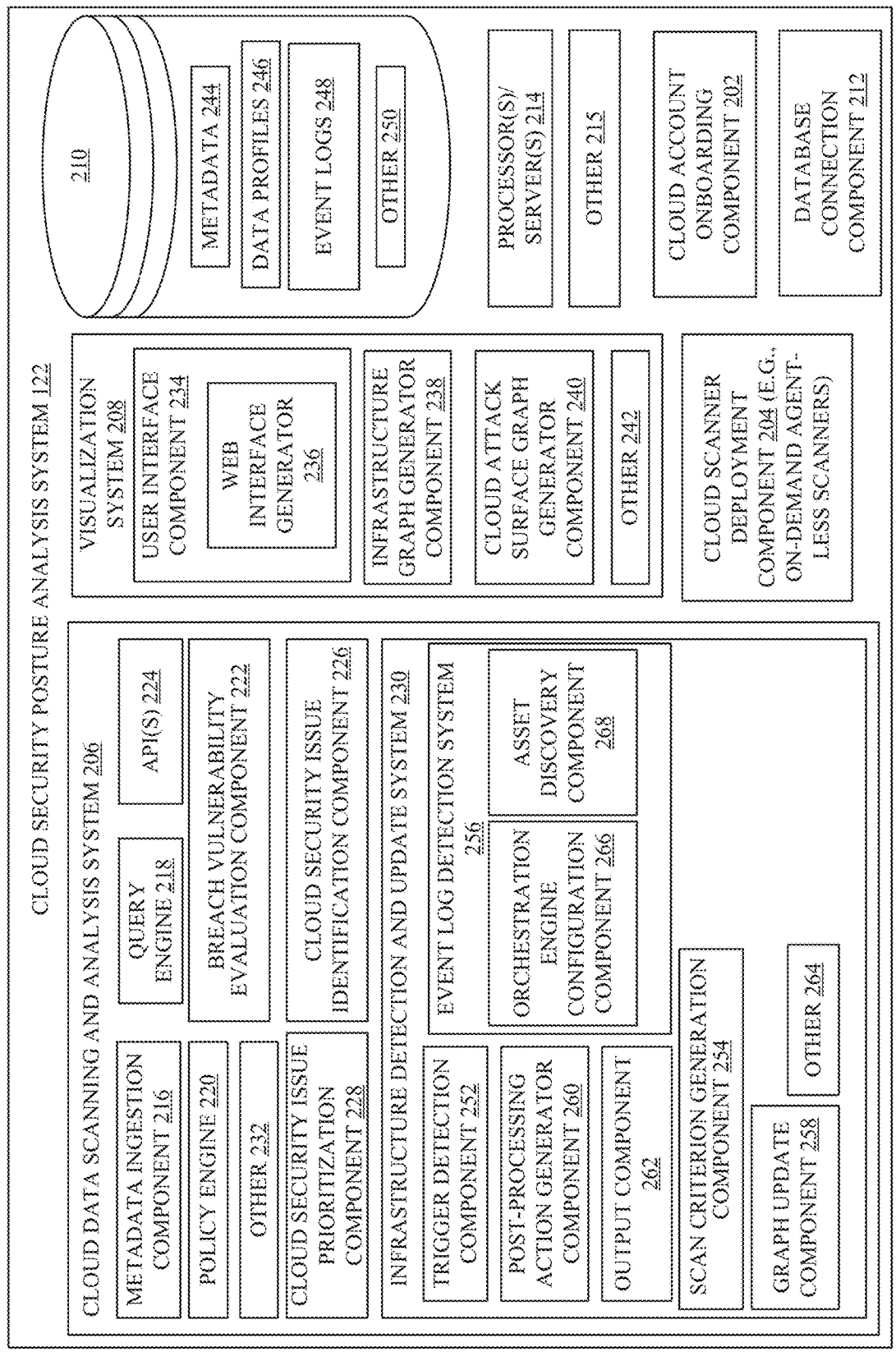
FIG. 3 is a block diagram illustrating one example of a cloud security posture analysis system.

FIG. 3 is a block diagram illustrating one example of cloud security posture analysis system 122. As noted above, system 122 can be deployed in cloud environment 102 and/or access cloud environment 102 through network 106 shown in FIG. 1.

System 122 includes a cloud account onboarding component 202, a cloud scanner deployment component 204, a cloud data scanning and analysis system 206, a visualization system 208, and a data store 210. System 122 can also include a database connection component 212, one or more processors or servers 214, and can include other items 215 as well.

Cloud account onboarding component 202 is configured to onboard cloud services 108 for analysis by system 122. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on resources 126 and access management and control system 128 directly within the cloud service, and generate metadata that is returned to system 122. Thus, in one example, the actual cloud service data is not required to leave the cloud service for analysis.

Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, an infrastructure detection and update system 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Visualization system 208 is configured to generate visualizations of the cloud security posture from system 206. Illustratively, system 208 includes a user interface component 234 configured to generate a user interface for a user, such as an administrator. In the illustrated example, component 234 includes a web interface generator 236 configured to generate web interfaces that can be displayed in a web browser on a client device.

Visualization system 208 also includes an infrastructure graph generator component 238, a cloud attack surface graph generator component 240, and can include other items 242 as well. Infrastructure graph generator component 238 is configured to generate a graph or other representation of the relationships between resources 126 or other infrastructure assets such as privileges, roles, etc. For example, component 238 can generate a cloud infrastructure graph, such as a map, that graphically depicts pairs of compute resources and storage resources as nodes and network communication paths as edges between the nodes.

Cloud attack surface graph generator component 240 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores metadata 244 obtained by metadata ingestion component 216, sensitive data profiles 246, detected event logs 248, and can store other items 250 as well. Examples of sensitive data profiles 246 are discussed in further detail below. Briefly, however, sensitive data profiles 246 can identify target data patterns that are to be categorized as sensitive or conforming to a predefined pattern of interest. Sensitive data profiles 246 can be used as training data for data classification. Examples of data classification are discussed in further detail below. For instance, however, pattern matching can be performed based on the target data profiles. Illustratively, pattern matching can be performed to identify instances of data patterns corresponding to social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Database connection component 212 is configured to connect to, or access, databases in the data stores of the resources being analyzed by system 122. Examples are discussed in further detail below. Briefly, however, database connection component 212 can receive user access credentials, such as a username and password, for each database of a plurality of databases to be accessed in the cloud environment and scanned by the deployed scanners. In another example, database connection component 212 can be configured to connect to representations of the databases that are accessed using a different authentication requirement, than the databases themselves. For example, database connection component 212 can identify and connect to snapshots of the databases through cloud provider APIs 150, discussed above. Database connection component 212 can access event logs 158, for the identified databases, from data store 152.

Infrastructure detection and update system 230 includes a trigger detection component 252, a scan criterion generation component 254, an event log detection system 256, a graph update component 258, a post-processing action generator component 260, an output component 262, and can include other items 264 as well.

Operation of system 230 is discussed in further detail below. Briefly, however, trigger detection component 252 is configured to detect a triggering criterion corresponding to initiation of an update scan of the infrastructure posture of cloud environment 102. The update scan is configured to identify changes to the infrastructure posture that occurred subsequent to a previous scan and update performed by system 230. In this way, the trigger criterion can be based on a temporal criterion, such as the duration and/or end time of a prior scan.

Scan criterion generation component 254 is configured to generate one or more scan criterion, for example based on the temporal triggering criterion. Event log detection system 256 includes an orchestration engine configuration component 266 and an asset discovery component 268. System 256 can include other items as well.

Orchestration engine configuration component 266 configures an orchestration engine to deploy one or more micro services to analyze event logs (herein referred to as log analyzer microservices). For example, the event logs can be a plurality of database activity logs for a plurality of databases in cloud environment 102. Here, the orchestration engine deploys, in parallel, a plurality of microservices to analyze those logs.

An example orchestration engine includes a tool or platform that automates and manages the deployment, configuration, coordination, and monitoring of complex applications or services. The orchestration engine can provide a centralized control system that streamlines the management of multiple components and resources, such as containerized applications, across distributed systems. In addition, the orchestration engine can include features such as load balancing, automatic failover, and resource allocation to help ensure that the application is highly available and can scale dynamically to handle changing workloads. In one example, each microservice is configured to perform a specific function that is deployable and scalable independently of other services. The deployed log analyzer microservice(s) return analysis results to the orchestration engine, such as in the form of metadata form the event logs.

Based on the results, graph update component 258 is configured to update the infrastructure graph, such as by adding nodes, adding edges, deleting nodes, deleting edges, or editing/changing existing nodes and/or edges in the graph. The updates can reflect, for example, changes to infrastructure assets, such as events that add, delete or change resources, such as compute resources (e.g., EC2 instances), storage resources (e.g., S3 instances), roles in the cloud environment, privileges, to name a few.

Output component 262 can output the analysis results to other systems. In one example, alerts or user interface displays, such as reports, can be provided to an administrator or other user.

Remedial action generator component 270 is configured to generate a remedial action that can be output to an administrator or user as a suggested action. Alternatively, or in addition, component 270 can generate control signals that perform the remedial action within the cloud environment. Examples are discussed in further detail below.

Figure 4:
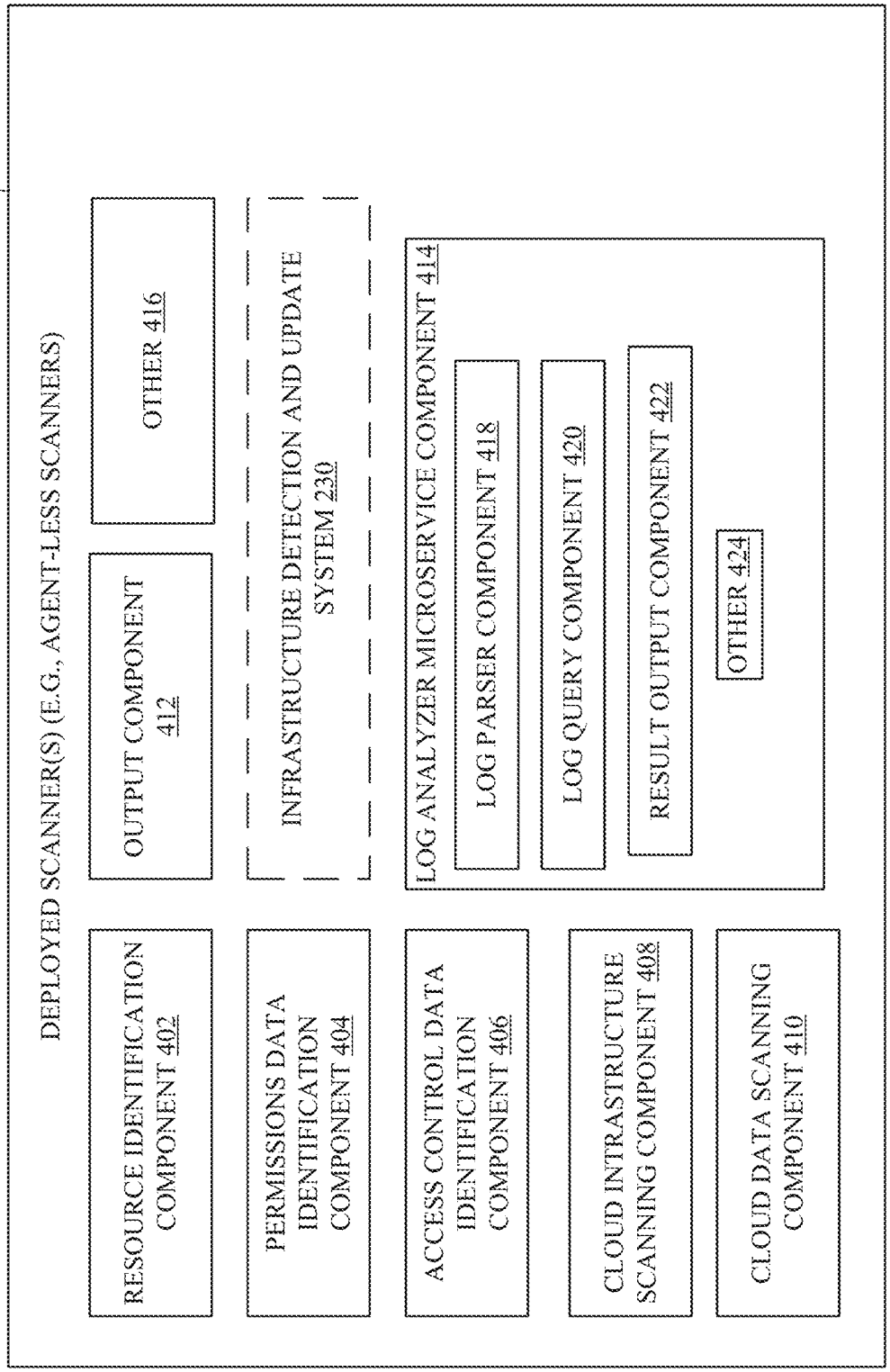
FIG. 4 is a block diagram illustrating one example of a deployed scanner.

FIG. 4 is a block diagram illustrating one example of a deployed scanner 148. Scanner 148 includes a resource identification component 402, a permissions data identification component 404, an access control data identification component 406, a cloud infrastructure scanning component 408, a cloud data scanning component 410, an output component 412, a log analyzer microservice component 414, and can include other items 416 as well. FIG. 4 also illustrates that some or all components of and/or functionality performed by system 230 can be on or otherwise associated with deployed scanner 148.

Resource identification component 402 is configured to identify the resources 126 within cloud service 108-1 (and/or other cloud services 108) and to generate corresponding metadata that identifies these resources. Permissions data identification component 404 identifies the permissions data 136 and access control data identification component 406 identifies access control data 138. Cloud infrastructure scanning component 408 scans the infrastructure of cloud service 108 to identify the relationships between resources 130 and 132 and cloud data scanning component 410 scans the actual data stored in storage resources 132. Output component 412 is configured to output the generated metadata and content-based classification results to cloud security posture analysis system 122.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. Examples are discussed in further detail below.

Log analyzer microservice component 414 is configured to analyze one or more event logs to identify incremental changes to infrastructure assets. Component 414 includes a log analyzer microservice that is employed and managed by an orchestration engine, as discussed above. Component 414 includes a log parser component 418, a log query component 420, a result output component 422, and can include other items 424 as well.

Log parser component 418 is configured to parse event logs, such as database event logs in a given database, on which the scanner is deployed. Examples of log analyzers are discussed in U.S. patent application Ser. No. 18/207,656, filed Jun. 8, 2023, the contents of which are hereby incorporated by reference in their entirety.

Briefly, the parsing can be done in any of a number of ways. In one example, log parser component 418 accesses each of a number of entries in the event log and identifies constituent data fields that identify various characteristics or parameters from a respective event or activity in the cloud environment. For example, the parsing can include an identification of what service (e.g., a resource or other asset) had a change, a time that the change occurred, what geographic region the change occurred in, what entity was involved in the change (e.g., a requestor identity), as well as any other attributes. These attributes can be returned as metadata by result output component 422.

Figure 5:
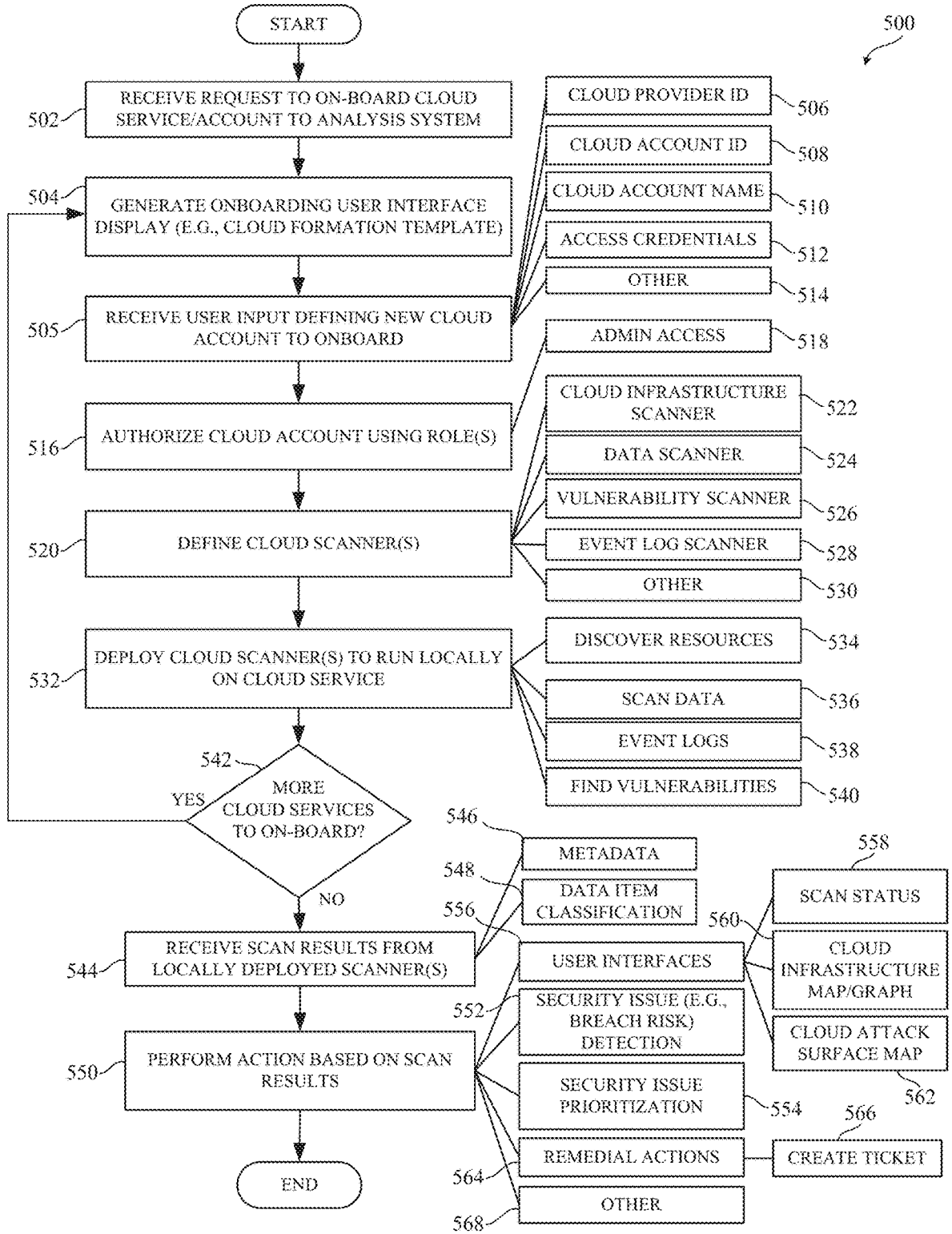
FIG. 5 is a flow diagram showing an example operation of on-boarding a cloud account and deploying one or more scanners.

FIG. 5 is a flow diagram 500 showing an example operation of system 122 in on-boarding a cloud account and deploying one or more scanners. At block 502, a request to on-board a cloud service to cloud security posture analysis system 122 is received. For example, an administrator can submit a request to on-board cloud service 108-1.

At block 504, an on-boarding user interface display is generated. At block 505, user input is received that defines a new cloud account to be on-boarded. The user input can define a cloud provider identification 506, a cloud account identification 508, a cloud account name 510, access credentials to the cloud account 512, and can include other input 514 defining the cloud account to be on-boarded.

At block 516, the cloud account is authorized using roles. For example, administrator access (block 518) can be defined for the cloud scanner using IAM roles. One or more cloud scanners are defined at block 520 and can include, but are not limited to, cloud infrastructure scanners 522, cloud data scanners 524, vulnerability scanners 526, event log scanners 528, or other scanners 530.

At block 532, the cloud scanners are deployed to run locally on the cloud service, such as illustrated in FIG. 2. The cloud scanners discover resources at block 534, scan data in the resources at block 536, event logs at block 538, and can find vulnerabilities at block 540. As discussed in further detail below, a vulnerability can be identified based on finding a predefined risk signature in the cloud service resources. The risk signatures can be queried upon, and define expected behavior within the cloud service and locate anomalies based on this data.

At block 542, if more cloud services are to be on-boarded, operation returns to block 504. At block 544, the scan results from the deployed scanners are received. As noted above, the scan results include metadata (block 546) and/or data item classifications (block 548) generated by the scanners running locally on the cloud service.

At block 550, one or more actions are performed based on the scan results. At block 552, the action includes security issue detection. For example, a breach risk on a particular resource (such as a storage resource storing sensitive data) is identified. At block 554, security issue prioritization can be performed to prioritize the detected security issues. Examples of security issue detection and prioritization are discussed in further detail below. Briefly, security issues can be detected by executing a query against the scan results using vulnerability or risk signatures.

The risk signatures identify criterion such as accessibility of the resources, access and/or permissions between resources, and data types in accessed data stores. Further, each risk signature can be scored and prioritized based on impact. For example, a risk signature can include weights indicative of likelihood of occurrence of a breach and impact if the breach occurs.

A risk signature can be defined based upon any of a wide variety of criteria. For example, a risk signature can identify one or more configurations or settings of compute resources 130. Examples include, but are not limited to, a configuration that indicates whether the compute resource provides accessibility to a particular type of data, such as confidential data, medical data, financial data, personal data, or any other type of private and/or sensitive content. In another example, a risk signature indicates that a compute resource is publicly accessible, includes a public Internet protocol (IP) address, or has IP forwarding enabled. In another example, a risk signature indicates that a compute resource has monitoring disabled, has no IAM role assigned to the compute resource, has backup disabled, data encryption disabled, and/or a low or short backup retention policy. Also, a risk signature can identify password policies set for the compute resource. For instance, a risk signature can indicate a lack of minimum password policies, such as no minimum password length, no requirement of symbols, lowercase letters, uppercase letters, numbers, or password reuse policy. Also, a risk criterion can indicate a location of the compute resource, such as whether the compute resource is located outside of a particular region.

Risk signatures can also indicate configurations and/or settings of storage resources 132. For example, the configurations and settings can indicate authentication or permissions enforced by the storage resource, such as whether authentication is required for read, write, delete, synchronization, or any other operation. Also, the risk signature can indicate whether multi-factor authentication is disabled for the storage resource, as well as a breadth of permissions grants (e.g., whether all authenticated users are granted permissions within the storage resource). Also, a risk signature can indicate whether encryption is enabled by default, a password policy enforced by the storage resource, whether the storage resource is anonymously accessible, publicly accessible, has a key management service disabled, has logging disabled, life cycle management disabled, whether the storage resource is utilized for website hosting, has geo-restriction disabled, or has backup functionality disabled. Also, the risk signature can indicate a type of data stored by the storage resource, such as the examples discussed above.

The action can further include providing user interfaces at block 556 that indicate the scan status (block 558), a cloud infrastructure representation (such as a map or graph) (block 560), and/or a cloud attack surface representation (map or graph) (block 562). The cloud attack surface representation can visualize vulnerabilities.

Remedial actions can be taken at block 564, such as creating a ticket (block 566) for a developer or other user to address the security issues. Of course, other actions can be taken at block 568. For instance, the system can make adjustments to cloud account settings/configurations to address/remedy the security issues.

Figure 6:
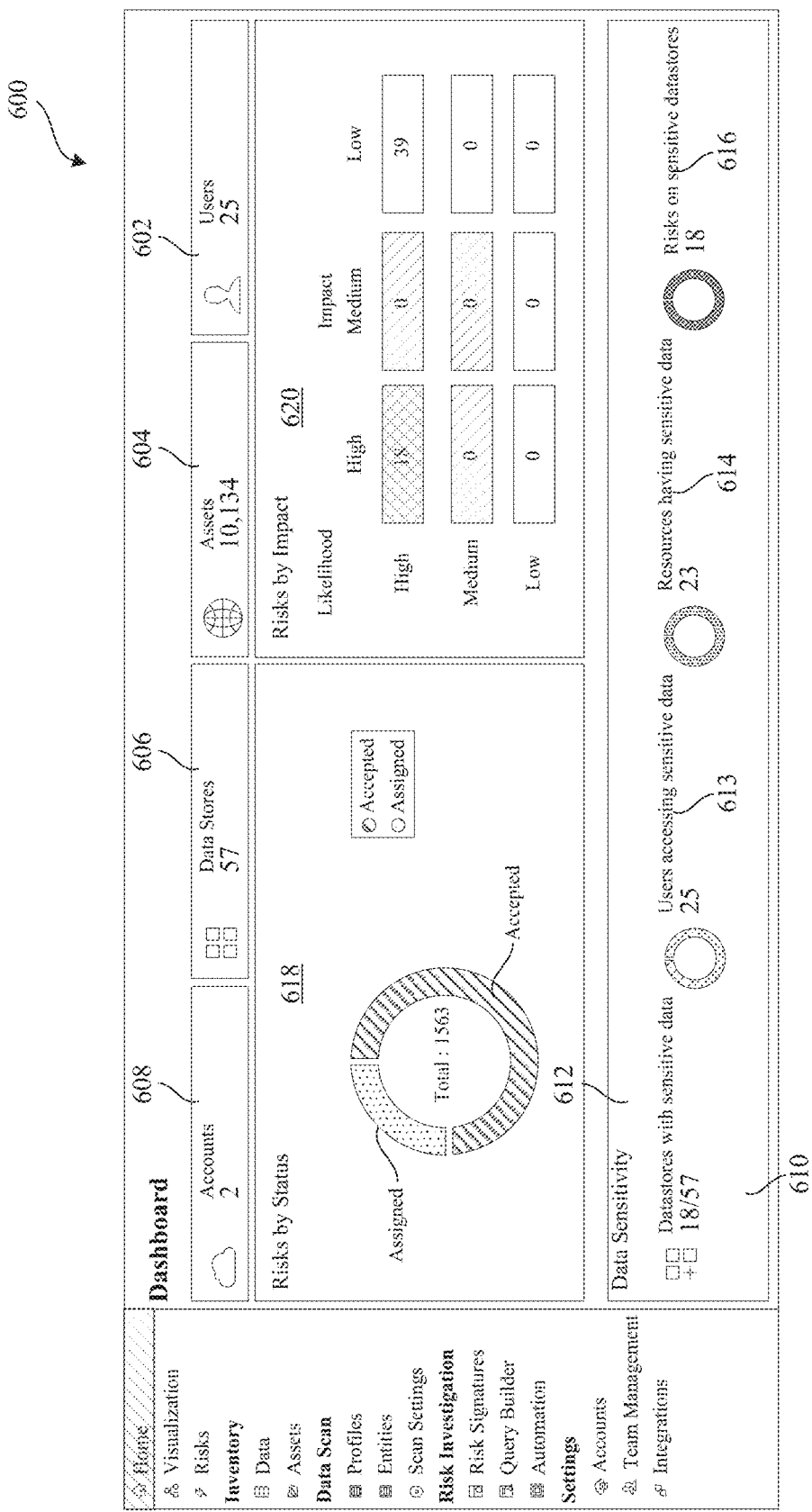
FIG. 6 illustrates one example of a user interface display having a dashboard representing on-boarded cloud service accounts.

FIG. 6 illustrates one example of a user interface display 600, that can be displayed at block 552. Display 600 provides a dashboard for a user which provides an overview of on-boarded cloud service accounts. The dashboard identifies a number of users 602, a number of assets 604, a number of data stores 606, and a number of accounts 608. A data sensitivity pane 610 includes a display element 612 that identifies a number of the data stores that include sensitive data, a display element 613 that identifies a number of users with access to the sensitive data, a display element 614 that identifies a number of resources having sensitive data, and a display element 616 that identifies a number of risks on the data stores having sensitive data. Further, graphs or charts can be generated to identify those risks based on factors such as status (display element 618) or impact (display element 620).

Display element 620 illustratively categorizes the risks based on impact as well as the likelihood of occurrence of those risks. Risk categorization is discussed in further detail below. Briefly, however, display element 620 stratifies one or more of breach likelihood scores or breach impact scores categories representing different levels of severity, such as high, medium, and low severity levels. In one example, display element 620 is color coded based on the degree of impact of the risk (e.g., high impact is highlighted in red, medium impact is highlighted in yellow, and low impact is highlighted in green).

Figure 7:
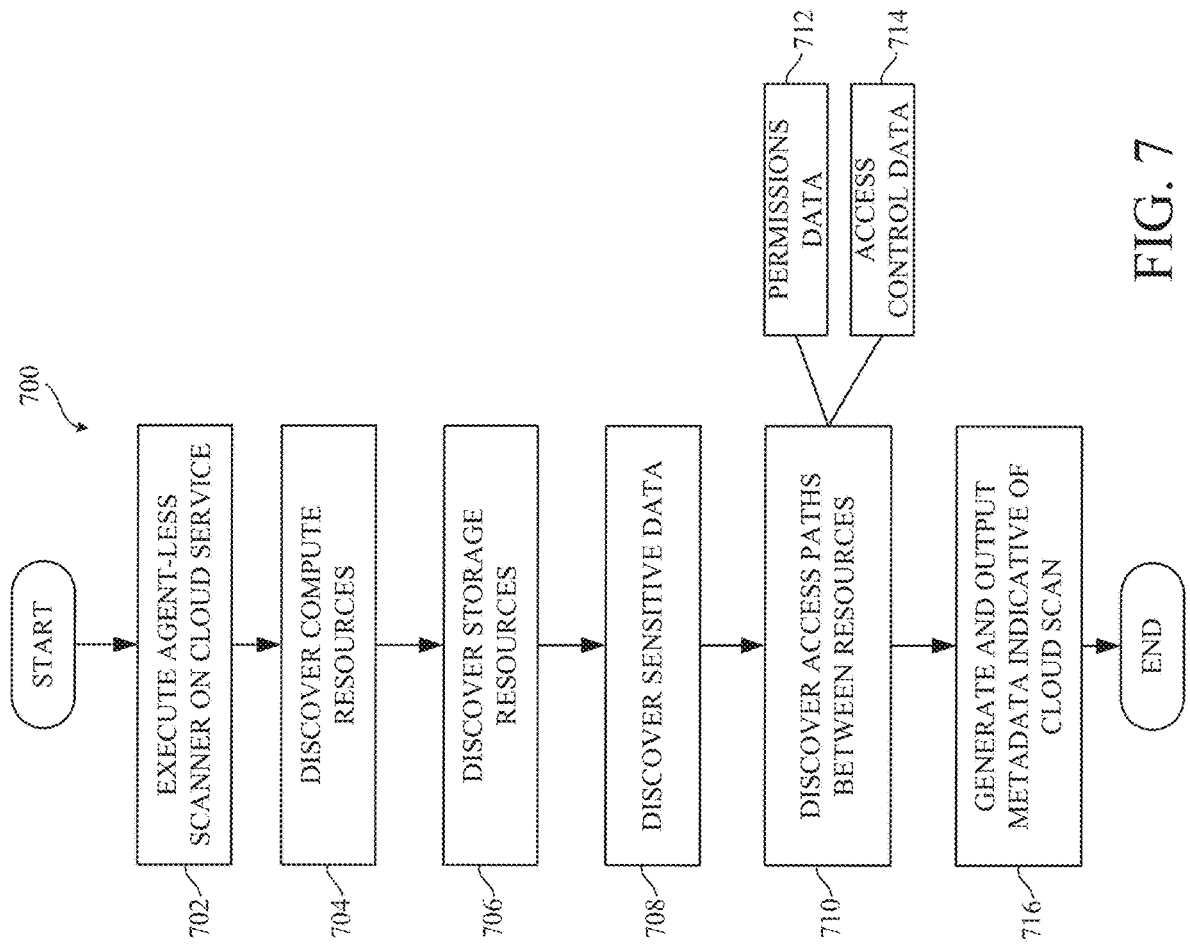
FIG. 7 is a flow diagram illustrating one example of cloud infrastructure scanning performed by a cloud scanner deployed in a cloud service.

FIG. 7 is a flow diagram 700 illustrating one example of cloud infrastructure scanning performed by cloud scanner 148 deployed in cloud service 108-1. At block 702, an agent-less scanner is executed on the cloud service. For example, a compute resource can utilize a serverless function to perform a scan on the cloud service.

At block 704, the scanner discovers the compute resources 130 and, at block 706, the storage resources 132. Sensitive data can be discovered at block 708. The agent-less scanner does not require a proxy or agent running in the cloud service, and can utilize server-less containers and resources to scan the documents and detect sensitive data. The data can be accessed using APIs associated with the scanners. The sensitive data can be identified using pattern matching, such as by querying the data using predefined risk signatures.

At block 710, access paths between the resources are discovered based on permissions data 136 (block 712), and/or access control data 138 (block 714). A rule processing engine, such as using JSON metadata, can be utilized to analyze the roles and policies, and can build access relationships between the nodes representing the resources. The policies can be decoded to get access type (allow, deny, etc.) and the policy can be placed in a node to link from a source to target node and create the access relationship. At block 716, metadata indicative of the scanning results is generated and outputted by metadata output component 272.

Figures 1, 8:
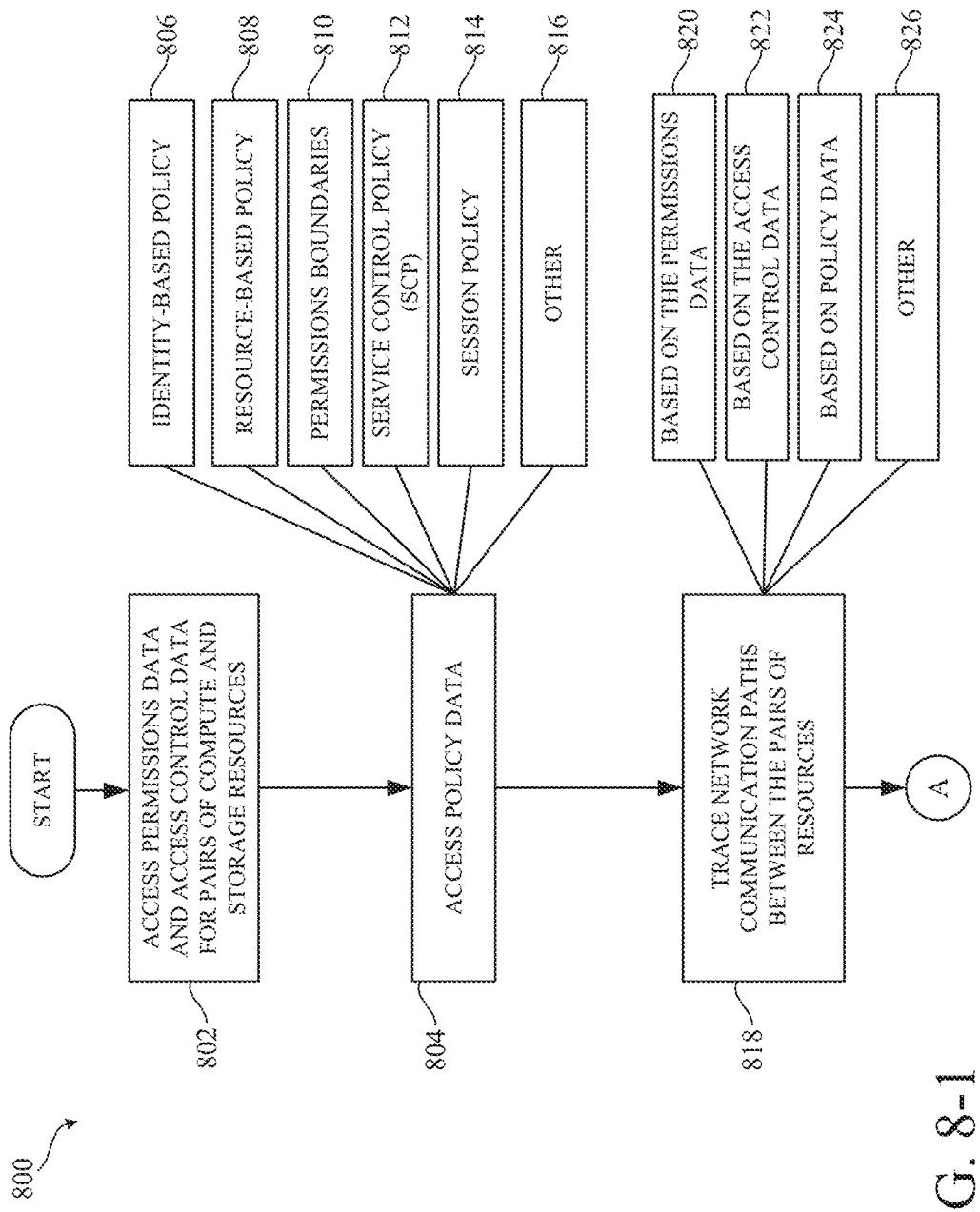
Figures 2, 8:
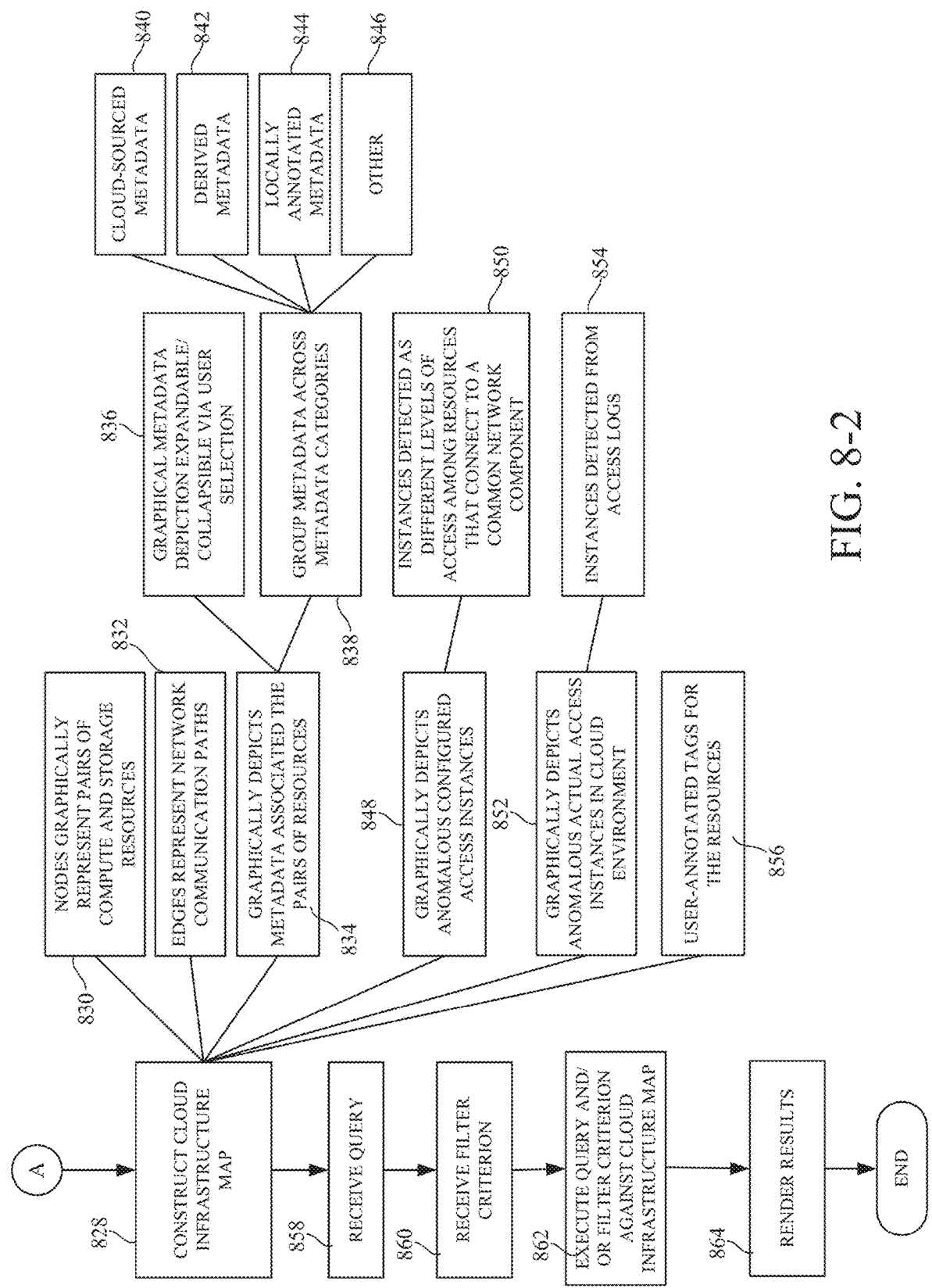

FIGS. 8-1 and 8-2 (collectively referred to as FIG. 8) provide a flow diagram 800 illustrating one example of infrastructure analysis and query execution. At block 802, permissions data and access control data for pairs of compute and storage resources is accessed. Policy data is accessed at block 804. For example, the policy data can include identity-based policies (block 806), resource-based policies (block 808), permissions boundaries (block 810), service control policies (SCP) (block 812), session policies (block 814) as well as other policies (block 816).

At block 818, network communication paths are traced between the pairs of resources. Tracing the network communication path can be based on the permissions data at block 820, the access control data at block 822, the policy data at block 824, and/or other data at block 826.

At block 828, a cloud infrastructure map is constructed. An example of a cloud infrastructure map includes nodes that graphically represent pairs of compute and storage resources (block 830), and edges that represent network communication paths between the resources (block 832). At block 834, the map graphically depicts metadata associated with the pairs of resources. For example, a graphical metadata depiction is expandable or collapsible via user selection, as represented at block 836. The metadata can be grouped across metadata categories at block 838, such as based on cloud-sourced metadata at block 840, derived metadata at block 842, locally annotated metadata at block 844, or based on other metadata categories at block 846.

The cloud infrastructure map can also graphically depict anomalous configured access instances at block 848. For example, block 848 can detect different levels of access among resources that connect to a common network component, as represented at block 850. At block 852, the map graphically depicts anomalous actual access instances in the cloud environment. For instance, the instances can be detected from access logs at block 854. User annotated tags for the resources can be depicted in the map at block 856 as well.

At block 858, a query is received. The query can include a search term, a content category, a data privacy policy, a temporal period, and can include other items as well.

Alternatively, or in addition, a filter criterion is received can be received at block 860. The filter criterion can be based on the metadata, based on applications running on at least one pair of resources, and/or based on one or more networks in the cloud environment.

The query and/or filter criterion are executed at block 862 and results are returned at block 864. For example, the query results can identify a subset of the pairs of resources that contain searched content.

Figure 9:
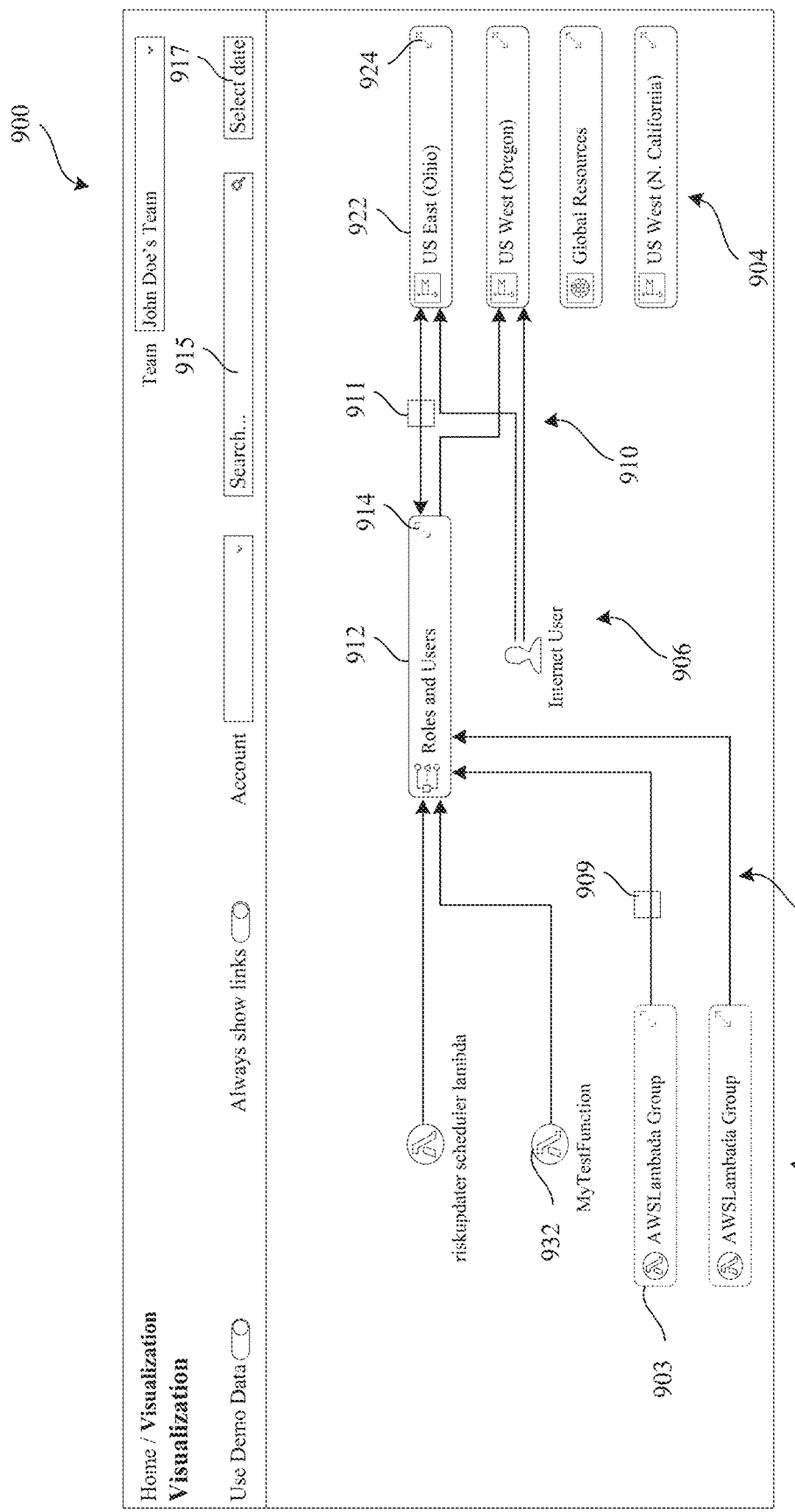
FIG. 9 illustrates an example user interface display.

FIG. 9 illustrates a user interface display 900 that includes a visualization of cloud infrastructure assets and relationships between those assets, such as access communication paths. The visualization in FIG. 9 can be rendered as a cloud infrastructure graph (e.g., map) that shows relationships between compute and storage resources and/or mappings between users, roles, and resources, based on the permissions data and the access control data. Further, the visualization can be augmented using sensitivity classification data to represent propagation of breach attack along communication paths.

As shown in FIG. 9, nodes 902 represent compute resources and nodes 904 represent storage resources. Illustratively, the storage resources include data stores or buckets within a particular cloud service. Nodes 906 represent roles and/or users. The links (e.g., access paths) or edges 908 between nodes 902 and 906 represent that compute resources that can access the particular roles represented by nodes 906. The edges or links 910 represent the storage resources that can be accessed by the particular roles or users represented by nodes 906.

Based on these relationships between compute and storage relationships, display elements can be rendered along, or otherwise visually associated with, the edges 908 and/or 910, to identify and graphically depict the propagation of breach attack. For instance, vulnerability display elements can be rendered in association with edges 908 and/or 910 to identify that a subject vulnerability signature (e.g., one or more risk signatures shown in FIG. 9) has been identified in the data, based on querying the permissions and access control data using the subject vulnerability signature. For example, display element 909 represents a risk signature between nodes 903 and 912 and display element 911 represents (such as by including a description, icon, label, etc.) a risk signature between nodes 912 and 922. Each display element 909, 911 can represent (such as by including a description, icon, label, etc.) corresponding likelihood and impact scores, can be actuatable to render details of the subject vulnerability, such as in a display pane on display 900. The details can include which risk signature has been matched, which sensitive data is at risk, etc.

Figures 1, 10:
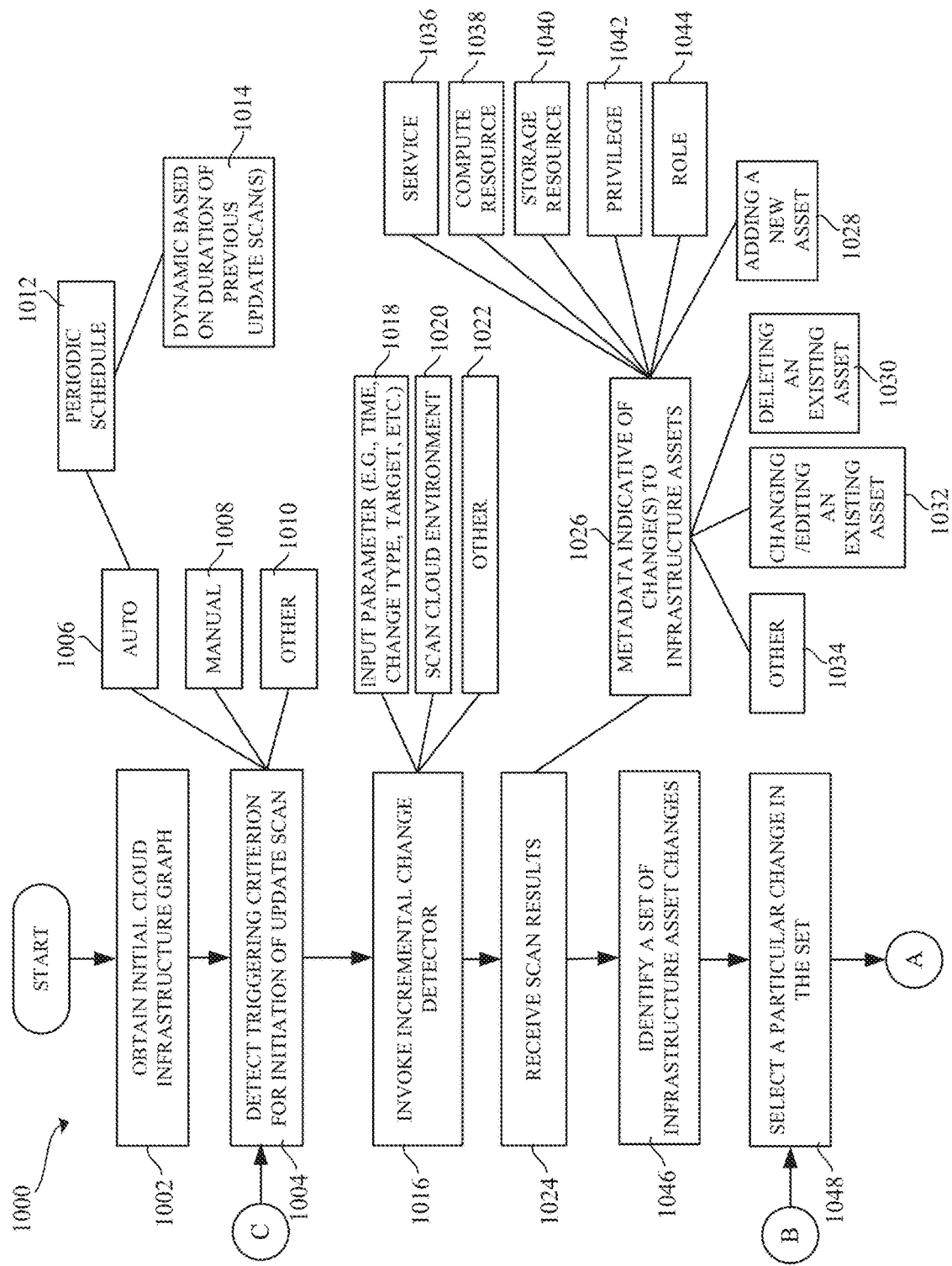
Figures 2, 10:
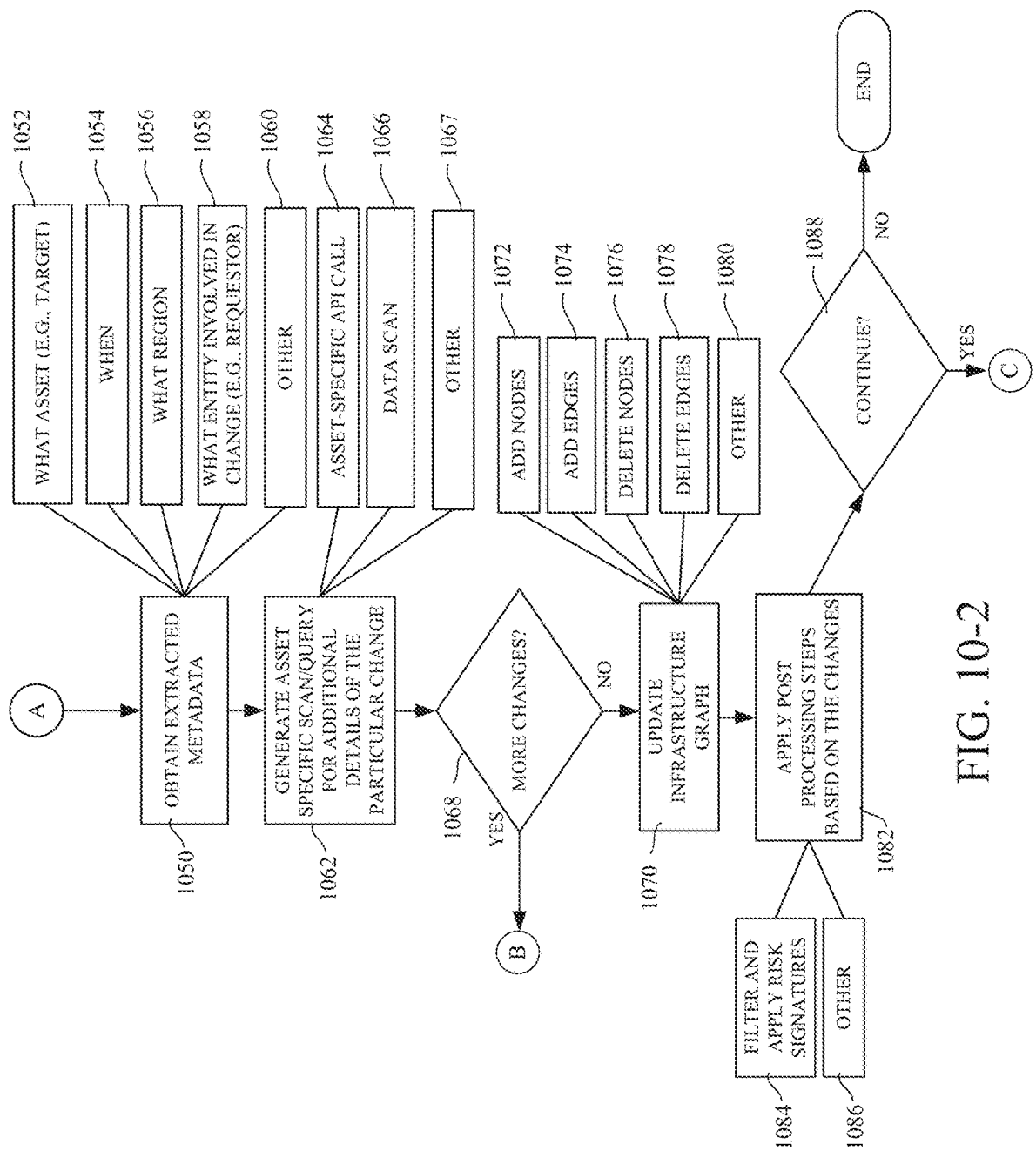

FIGS. 10-1 and 10-2 (collectively referred to as FIG. 10) provide a flow diagram 1000 of an example operation of infrastructure posture analysis using incremental change detection. For sake of illustration, but not by limitation, FIG. 10 will be discussed in the context of system 200 discussed above with respect to FIG. 3.

At block 1002, an initial cloud infrastructure graph is obtained. An example infrastructure graph includes nodes that represent resources in the cloud environment and edges, between the nodes, that represent relationships between the resources. Examples are discussed above with respect to FIGS. 8 and 9.

At block 1004, a triggering criterion for initiation of an update scan is detected. For example, the detection can be automatic at block 1006, manual at block 1008, or another type of input, as represented at block 1010.

In one example, the triggering of the update scan is performed automatically according to a periodic schedule, as represented at block 1012. For example, the update scan can be performed every x number of hours (e.g., one hour, two hours, three hours, etc.). In another example, the period schedule can define that a next update scan is to occur x number of minutes (e.g., fifteen minutes, etc.) after the previous scan has completed. In this way, the periodic schedule can be dynamic based on a duration of a previous update scan, as represented at block 1014.

An incremental change detector is invoked. One example of an incremental change detector is discussed below with respect to FIG. 11. Briefly, however, the incremental change detector can receive an input parameter at block 1018, such as a target time within which to detect changes in the cloud infrastructure. For example, the input parameter indicates a time at which a previous scan ended. In this way, the incremental change detector will identify any changes that occur since the last time the cloud infrastructure was scanned to update the infrastructure graph.

At block 1020, the cloud environment is scanned by the incremental change detector. The incremental change detector can invoked in other ways as well, as represented at block 1022.

At block 1024, scan results are received from the change detector. The scan results can include metadata received at block 1026, indicative of changes to one or more infrastructure assets. A change to an infrastructure asset can include, but are not limited to, the addition of a new asset (block 1028), the deletion of an existing asset (block 1030), the changing or editing of an existing asset (block 1032), or other types of changes (block 1034).

Further, the asset can include, but is not limited to, a particular service or service configuration, as represented at block 1036. An asset can include a compute resource (block 1038), a storage resource (block 1040), a privilege (block 1042), and/or a role (block 1044).

For sake of illustration, an example change indicates that a user y launched a new compute resource (e.g. a particular EC2 instance) of type z at a particular time t. The returned metadata can indicate the user, a unique identifier that identifiers the launched resource, and the type of the resource. The metadata can also indicate the roles and/or privileges given to that resource.

At block 1046, a set of infrastructure asset changes are identified based on the scan results. Based on the set of infrastructure asset changes, post processing steps can be constrained to the set of infrastructure asset changes. In this way, the post processing is not performed for the entire infrastructure posture, but the post processing is narrowly tailored to only the particular incremental changes detected during the current scan.

For example, at block 1048, a particular change in the set of infrastructure asset changes is selected and, at block 1050, the extracted metadata for that change is obtained.

The metadata extracted at block 1050 can include metadata identifying which infrastructure asset (e.g., the target of the event such as a particular storage resource) which is represented at block 1052. Alternatively, or in addition, the extracted metadata can identify when the event occurred (block 1054), which region the event occurred in (block 1056), which entity was involved in the change (block 1058) and can include other metadata (block 1060) as well. The entity involved in the change at block 1058 can include the identity of a particular requestor (a user, role, service, etc.).

At block 1062, an asset-specific scan and/or query is generated for additional details of the particular change. For example, an asset-specific API call can be generated to access the particular infrastructure asset that was the target of the particular change being analyzed. The call can be utilized, for example, to perform a data scan on the data in the resource, as represented at block 1064. For example, the data scan can identify which data profiles reside in the resource, such as sensitive data. Of course, the additional details for the particular change can be identified in other ways as well, as represented at block 1066.

At block 1068, the operation determines whether there are more changes in the set of infrastructure asset changes to be analyzed. If so, operation returns to block 1048 in which another change from the set is selected to obtain the extracted metadata and generate a scan or query for additional details on a particular change.

At block 1070, the infrastructure graph can be updated in a post processing step. An example of performing operations in an infrastructure graph is discussed above with respect to FIG. 8. Block 1070 can include similar features as those described with respect to FIG. 8.

Updating the infrastructure graph can include, for example, adding nodes at block 1072, adding edges at block 1074, deleting nodes at block 1076, deleting edges at block 1078, or other updates at block 1080. For example, the configuration represented by nodes and/or edges can be modified to represent changes in the infrastructure posture.

For sake of illustration, but not by limitation, if one of the events in the set of infrastructure asset changes identifies that a user added a new compute resource that is accessible by a compute resource with a particular role, a new node and edge can be added to the infrastructure graph to identify the new resource and relationship to the existing resource(s) identified in the graph.

At block 1082, other post processing steps can be applied based on the changes as well. For example, the post processing steps can include filtering a set of risk signatures to obtained a filtered set of risk signatures, and applying the filtered set of risk signatures at block 1084. Examples of block 1084 are discussed below with respect to FIG. 12. Briefly, however, block 1084 can include identifying attributes in the set of infrastructure asset changes, and determining which risk signatures are applicable to those assets. Block 1084 can include, but is not limited to, utilizing tags that identify the type of assets (whether the assets being changed are ECs instances, S3 buckets, RDS assets, etc.). Using this information, a set of risk signatures can be filtered into a reduced, filtered set of risk signatures, and only those risk signatures in the reduced set can be applied. Filtering the risk signatures before application to the infrastructure graph reduces processing time and load required to process the graph for matching risk signatures. Of course, other post processing steps can be performed at block 1086.

At block 1088, operation determines whether to continue by, for example, initiating a subsequent update scan based on triggering criteria detected at block 1004.

Figure 11:
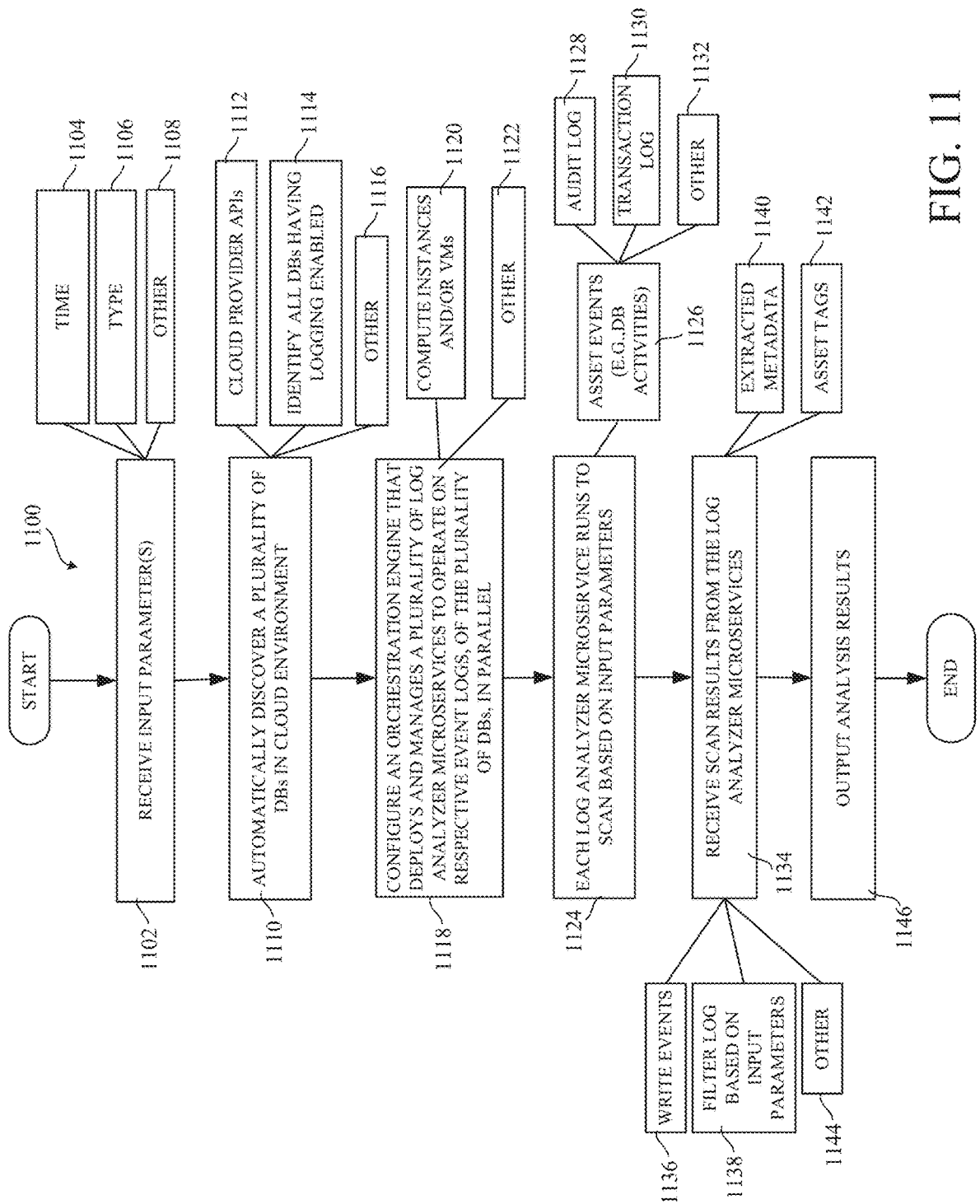
FIG. 11 is a flow diagram illustrating one example of invoking an incremental change detector.

FIG. 11 is a flow diagram 1100 illustrating one example of invoking an incremental change detector at block 1016.

At block 1102, input parameters are received. As noted above, the input parameters can include, but are not limited to, a temporal criteria at block 1104. For example, the temporal criteria can indicate a time that a previous scan ended and thus a beginning time instance for a time window within which to perform the incremental change detection. The input parameters can also indicate a type to detect changes, as represented at block 1106. Of course, other input parameters can be received as well, as represented at block 1108.

At block 1110, a plurality of target constructs are identified for which to perform log scanning. In one example, block 1110 includes discovering a plurality of databased in the cloud environment, such as by using cloud provider APIs at block 1112, and/or identifying databases having logging enabled at block 1114. Of course, the locations to scan for change detection can be performed in other ways as well, as represented at block 1116.

At block 1118, an orchestration engine is configured that deploys and manages a plurality of log analyzer microservices to operate on respective event logs. In one example, block 1118 includes operating on a plurality of respective event logs, in parallel, that correspond to a plurality of databases. The orchestration engine and/or log analyzer microservices can include compute instances and/or virtual machines at block 1120. For example, a serverless compute instance, such as a lambda instance, can be utilized. Of course, the plurality of log analyzer microservices can be deployed and managed in other ways as well, as represented at block 1122.

At block 1124, each log analyzer microservice runs to scan the corresponding event log(s) based on the input parameters received at block 1102. Block 1124 can include identifying the asset change events at block 1126, that match the input parameters. Examples of event logs that can be scanned include, but are not limited to, audit logs at block 1128, transaction logs at block 1130, or other types of logs at block 1132.

At block 1134, scan results are received from the log analyzer microservices. Block 1134 can include results that identify write events (block 1136) identified by the log analyzer microservices in the event logs. A write event includes activities such as creating a new resource, changing an existing resource, deleting a resource, etc. This is contrasted to a read event in which the activity includes only a data access.

At block 1138, the event log can be filtered based on the input parameters. In this way, the scan results received from the log analyzer microservice include filtered event logs received as extracted metadata at block 1140. Alternatively, or in addition, the scan result can include asset tags (block 1142), that provide information (such as resource type, etc.) of the assets that were changed. Of course, the scan results can be received in other ways as well, as represented at block 1144. At block 1146, analysis results are outputting based on the scan results.

Figure 12:
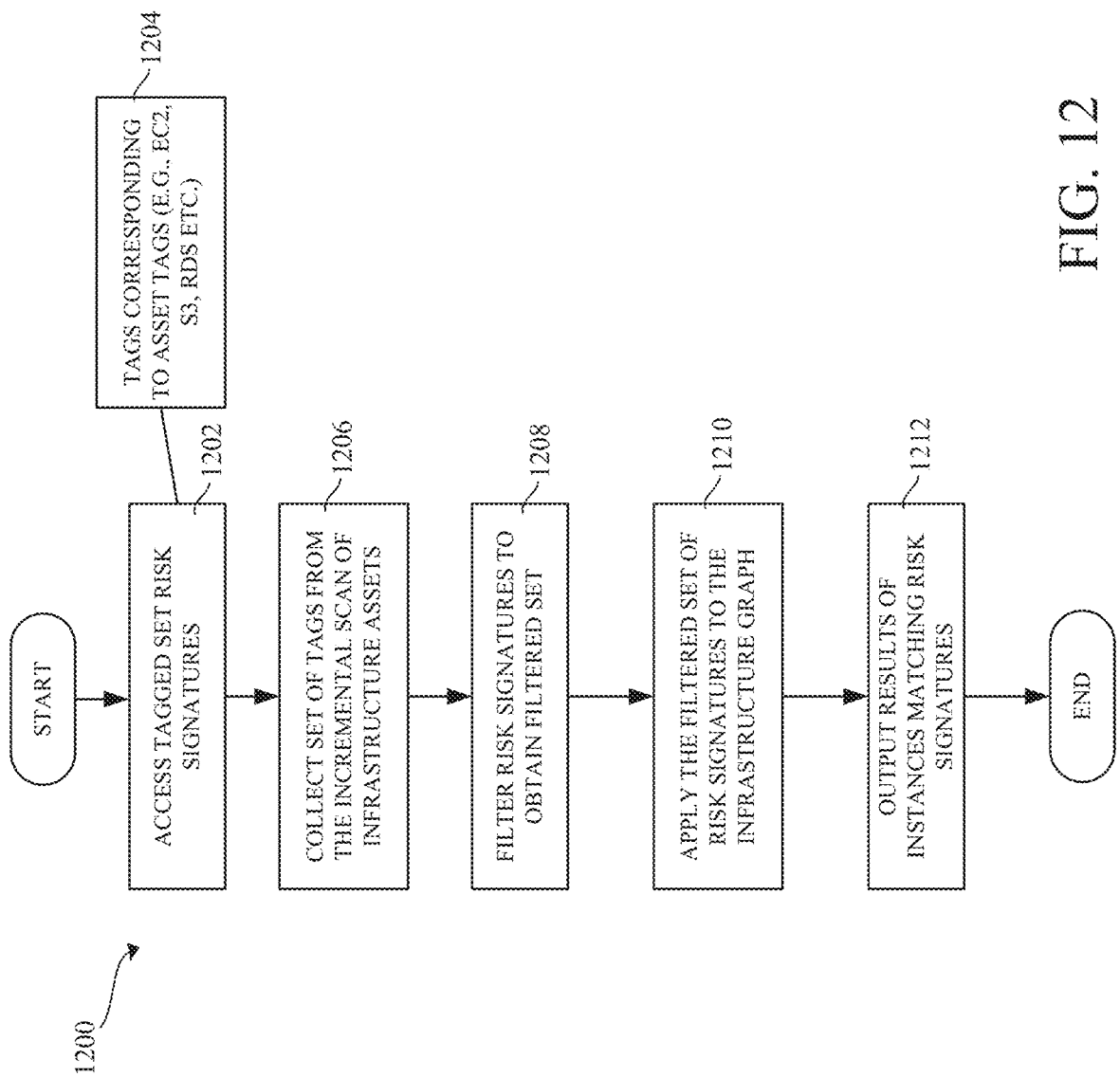
FIG. 12 is a flow diagram illustrating one example of filtering and applying risk signatures.

FIG. 12 is a flow diagram 1200 illustrating one example of filtering and applying risk signatures at block 1084. As represented at block 1204, the tags correspond to asset tags, such as identifying the types of resources to which a given risk signature is relevant.

At block 1202, a tag set of risk signatures is accessed. FIG. 13 illustrates one example of a user interface display 1300, that renders a set of tagged risk signatures. As shown in FIG. 13, display 1300 provides a searchable interface to access, modify, add, and/or delete risk signatures that can be applied to the cloud infrastructure posture. Each risk signature defines a set of criteria that the resources and data in the cloud environment can be queries upon to identify indications of vulnerabilities in the cloud service.

The example of FIG. 13 provides the set of tagged risk signatures in a tabular format, having a plurality of rows 1302 each representing a different risk signature. Each row includes a plurality of data fields or cells arranged in a plurality of columns 1304. The plurality of columns includes a name column 1306, a signature ID column 1308, a description column 1310, a result header column 1312, a resource column 1314, a tags column 1316, a breach likelihood factor column 1318, and a breach impact factor column 1320. Column 1306 includes a name of the given risk signature, uniquely identified by a signature ID in column 1308. The description column 1310 describes the risk signature, and the result header column 1312 identifies the information to be returned in results that match the risk signature. The tags column 1316 identifies one or more tags, for the given risk signature. The tags identify characteristics of the resources to which the risk signature applies. For example, the tags 1322 for risk signature 1324 indicate that the risk signature is applicable to S3 resources. This, of course, is for sake of example only.

Likelihood factor column 1318 indicates a likelihood factor that is assigned to the risk signature and an impact factor column 1320 indicates an impact factor assigned to the risk signature. The likelihood factor indicates a likelihood assigned to occurrence of the risk signature and the impact factor assigns an impact to the cloud service assigned to the occurrence of the risk signature. For sake of illustration, a likelihood factor of ten (out of a scale of ten) indicates that the vulnerability is likely to occur if the risk signature is identified in the cloud posture data, whereas a likelihood factor of one indicates a low likelihood. Similarly, an impact factor of ten (out of a scale of ten) indicates that the vulnerability is considered to have a high impact, whereas an impact factor of one indicates the vulnerability is considered to have a low impact on the cloud service.

Referring again to FIG. 12, at block 1206, a set of tags from the incremental scan of infrastructure resources is collected. For sake of example, assume that the operation described in FIG. 10 returns fifty asset changes that have occurred in the cloud infrastructure. Block 1206 analyzes these changes to identify the tags relevant to the resources involved in the changes. For instance, if the set of changes involved EC2 instances and S3 buckets, block 1206 returns the tags "S3" and "EC2."

At block 1208, the risk signatures are filtered to obtain a filtered set. To illustrated, in the above example where two tags "EC2" and "S3" are returned, block 1208 returns the risk signatures in the set of tagged risk signatures accessed at block 1202 that include at least one of the tags "S3" or "EC2." In other words, block 1208 operates to filter the collection of risk signatures to identify only those risk signatures that are tagged as applicable to the type of asset(s) involved in the changes.

Thus, when the risk signatures are applied at block 1210, only the filtered set of risk signatures is applied to the infrastructure graph, which reduces the processing expense and reduces processing latency in finding instances of matching risk signatures in the infrastructure graph.

At block 1212, results of the instances of matching risk signatures are outputted, for example in a user interface display. One example display is illustrated in FIG. 14.

Figure 14:
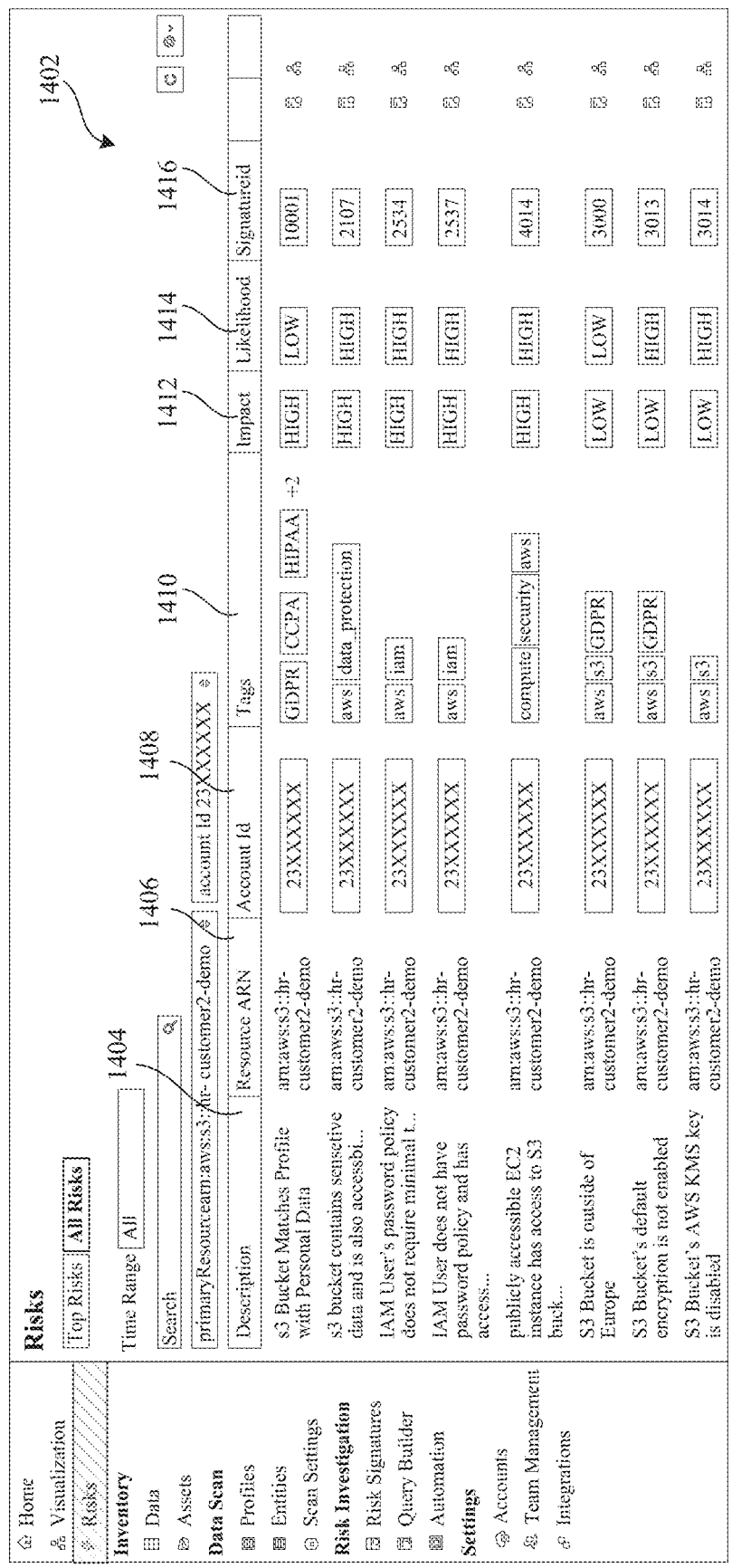
FIG. 14 illustrates one example of a user interface display that renders instances of matched risk signatures.

As shown in FIG. 14, display 1400 includes a plurality of rows 1402 that indicate matching instances of risk signatures. Each row includes a description field in column 1404, a resource name field in column 1406, an account ID field in column 1408, a tags field in column 1410, an impact field in column 1412, a likelihood field in column 1414, and a signature ID field in column 1416. The signature ID field in column1 416 identifies the signature ID that was matched by the instance identified in the row. The tags field identifies which tags were matched between the infrastructure change and the risk signature that was matched for the given row.

It can thus be seen that the present disclosure provides technology for data security posture analysis of a cloud environment. In some described examples, the technology provides an incremental change detector that deploys services in a cloud environment that operate on event logs to identify asset changes within a time period. Information from those changes is utilized for processing steps such as updating an infrastructure graph and applying risk signatures to identify vulnerabilities, for example. The present technology improves the performance in security of cloud databases in a way that maintains up-to-date posture data through reduced processing bandwidth requirements, which improves latency. The present technology improves the performance in security of cloud databases.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 15:
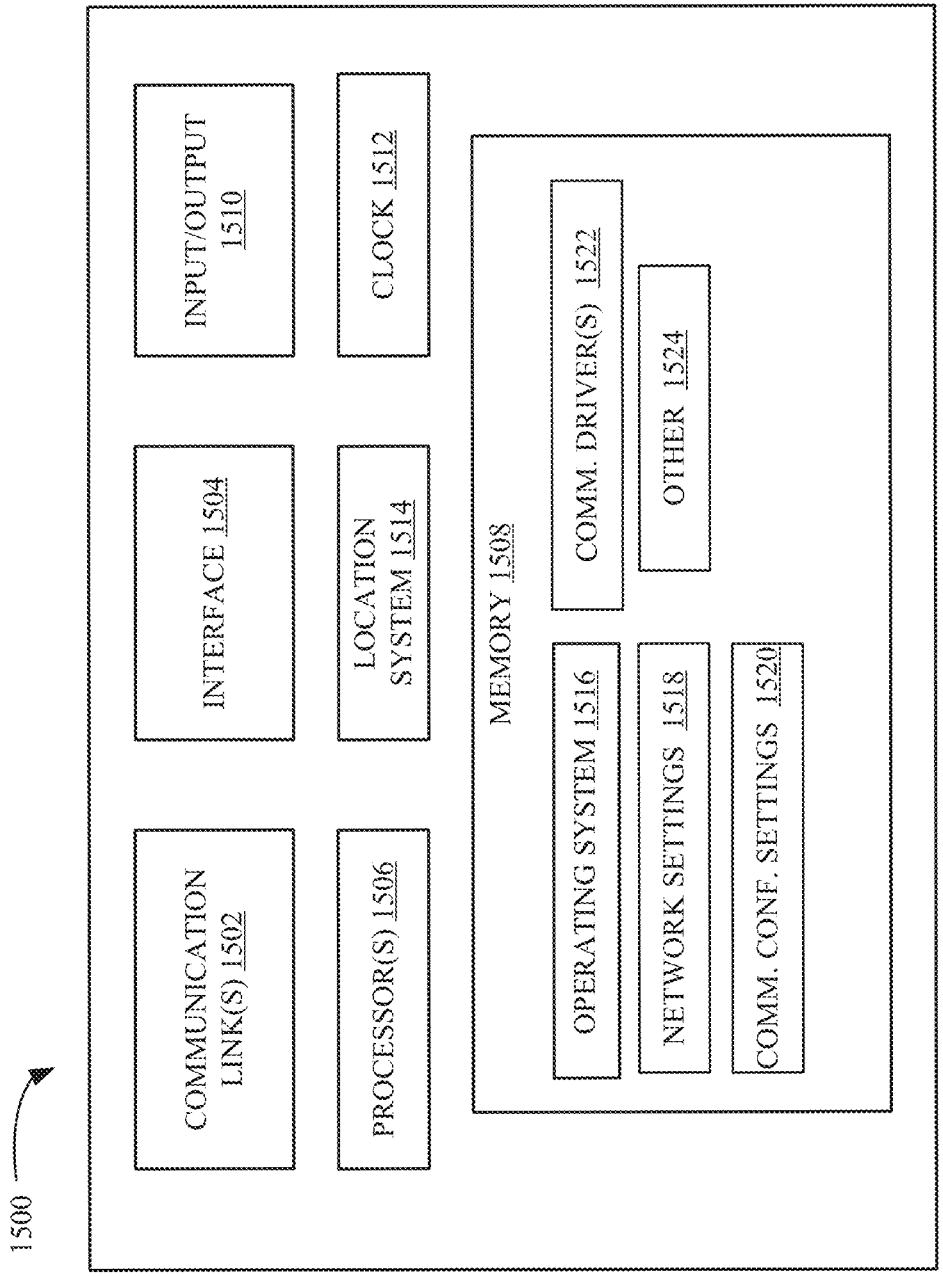
FIG. 15 is a simplified block diagram of one example of a client device.
Figure 16:
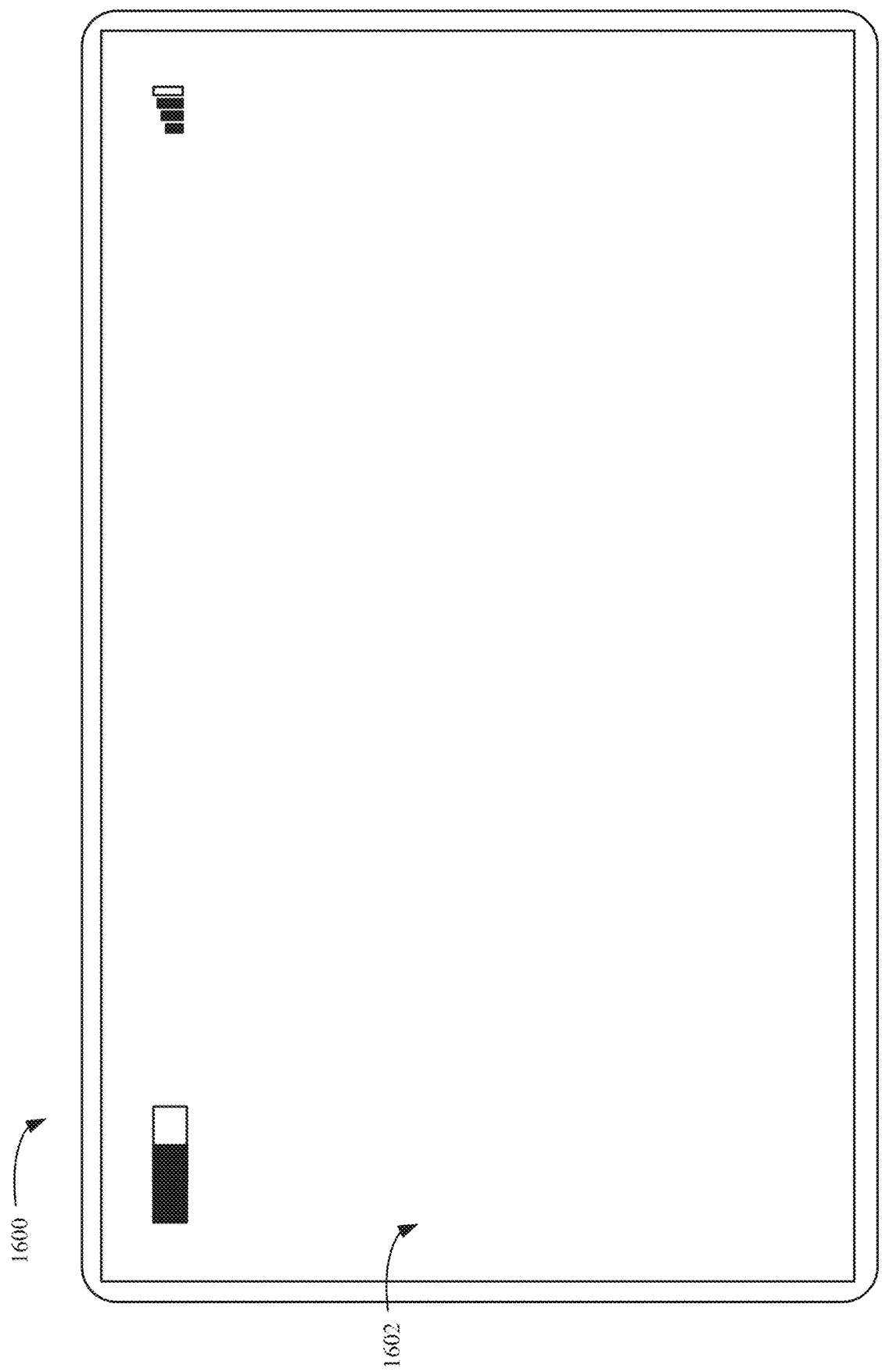
FIG. 16 illustrates an example of a handheld or mobile device.

FIG. 15 is a simplified block diagram of one example of a client device 1500, such as a handheld or mobile device, in which the present system (or parts of the present system) can be deployed. FIG. 16 illustrates an example of a handheld or mobile device.

One or more communication links 1502 allows device 1500 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1504. Interface 1504 and communication links 1502 communicate with one or more processors 1506 (which can include processors or servers described with respect to the figures) along a communication bus (not shown in FIG. 26), that can also be connected to memory 1508 and input/output (I/O) components 1510, as well as clock 1512 and a location system 1514.

Components 1510 facilitate input and output operations for device 1500, and can include input components such as microphones, touch screens, buttons, touch sensors, optical sensors, proximity sensors, orientation sensors, accelerometers. Components 1510 can include output components such as a display device, a speaker, and or a printer port.

Clock 1512 includes, in one example, a real time clock component that outputs a time and date, and can provide timing functions for processor 1506. Location system 1514 outputs a current geographic location of device 1500 and can includes a global positioning system (GPS) receiver, a LORAN system, a dead reckoning system, a cellular triangulation system, or other positioning system. Memory 1508 stores an operating system 1516, network applications and corresponding configuration settings 1518, communication configuration settings 1520, communication drivers 1522, and can include other items 1524. Examples of memory 1508 include types of tangible volatile and non-volatile computer-readable memory devices. Memory 1508 can also include computer storage media that stores computer readable instructions that, when executed by processor 1506, cause the processor to perform computer-implemented steps or functions according to the instructions. Processor 1506 can be activated by other components to facilitate functionality of those components as well.

FIG. 16 illustrates one example of a tablet computer 1600 having a display screen 1652, such as a touch screen or a stylus or pen-enabled interface. Screen 1602 can also provide a virtual keyboard and/or can be attached to a keyboard or other user input device through a mechanism, such as a wired or wireless link. Alternatively, or in addition, computer 1600 can receive voice inputs.

Figure 17:
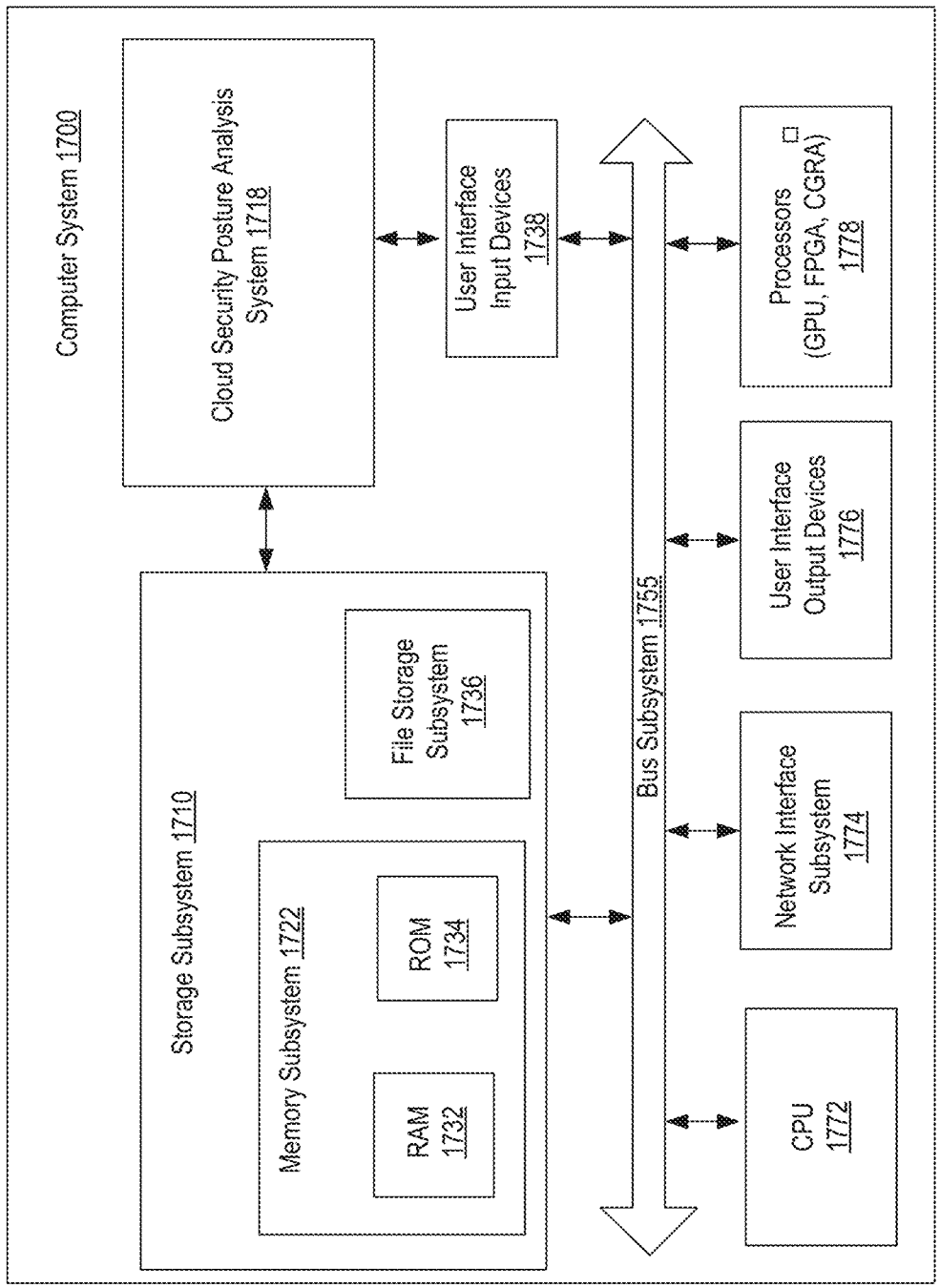
FIG. 17 shows an example computer system.

FIG. 17 shows an example computer system 1700 that can be used to implement the technology disclosed. Computer system 1700 includes at least one central processing unit (CPU) 1772 that communicates with a number of peripheral devices via bus subsystem 1755. These peripheral devices can include a storage subsystem 1710 including, for example, memory devices and a file storage subsystem 1736, user interface input devices 1738, user interface output devices 1776, and a network interface subsystem 1774. The input and output devices allow user interaction with computer system 1700. Network interface subsystem 1774 provides an interface to outside networks, including an interface to corresponding interface devices in other computer systems.

In one implementation, cloud security posture analysis system 1718 is communicably linked to the storage subsystem 1710 and the user interface input devices 1738.

User interface input devices 1738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1700.

User interface output devices 1776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1700 to the user or to another machine or computer system.

Storage subsystem 1710 stores programming and data constructs that provide the functionality of some or all of the modules and methods described herein. These software modules are generally executed by processors 1778.

Processors 1778 can be graphics processing units (GPUs), field-programmable gate arrays (FPGAs), application-specific integrated circuits (ASICs), and/or coarse-grained reconfigurable architectures (CGRAs). Processors 1778 can be hosted by a deep learning cloud platform such as Google Cloud Platform™, Xilinx™, and Cirrascale™. Examples of processors 1778 include Google's Tensor Processing Unit (TPU)™, rackmount solutions like GX4 Rackmount Series™, GX50 Rackmount Series™, NVIDIA DGX-1™, Microsoft's Stratix V FPGA™, Graphcore™ Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1722 used in the storage subsystem 1710 can include a number of memories including a main random access memory (RAM) 1732 for storage of instructions and data during program execution and a read only memory (ROM) 1734 in which fixed instructions are stored. A file storage subsystem 1736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1736 in the storage subsystem 1710, or in other machines accessible by the processor.

Bus subsystem 1755 provides a mechanism for letting the various components and subsystems of computer system 1700 communicate with each other as intended. Although bus subsystem 1755 is shown schematically as a single bus, alternative implementations of the bus subsystem can use multiple busses.

Computer system 1700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1700 depicted in FIG. 17 is intended only as a specific example for purposes of illustrating the preferred implementations of the present invention. Many other configurations of computer system 1700 are possible having more or less components than the computer system depicted in FIG. 17.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for analysis of infrastructure posture of a cloud environment, the system comprising:
    a processor and memory accessible by the processor, the memory including instructions executable to:
        detect a triggering criterion corresponding to initiation of an update scan of the infrastructure posture of the cloud environment
        select a time period based on a previous scan of the infrastructure posture of the cloud environment;
        invoke an incremental change detector based on the triggering criterion, the incremental change detector configured to scan the cloud environment and return a scan result that identifies one or more changes to a set of infrastructure assets in the cloud environment within the time period, and the one or more changes comprise at least one of:
            adding a particular service or configuration in the cloud environment,
            deleting a particular service or configuration in the cloud environment, or
            editing a particular service or configuration in the cloud environment; and
        update a cloud infrastructure graph based on the one or more changes to the set of infrastructure assets, wherein the cloud infrastructure graph defines nodes that represent resources in the cloud environment and edges, between the nodes, that represent relationships between the resources.

2. The system of claim 1, wherein the triggering criterion is based on a duration of a previous scan of the infrastructure posture of the cloud environment.

3. The system of claim 1, wherein each change, of the one or more changes to the set of infrastructure assets, comprises at least one of:
    adding an infrastructure asset to the set of infrastructure assets,
    deleting an infrastructure asset from the set of infrastructure assets, and
    changing an infrastructure asset in the set of infrastructure assets.

4. The system of claim 1, wherein the infrastructure assets comprise at least one of:
    a compute resource,
    a storage resource,
    a privilege, or
    a role.

5. The system of claim 1, wherein the incremental change detector comprises a log analyzer microservice configured to scan an event log having a plurality of event log entries that represent events in the cloud environment.

6. The system of claim 5, wherein the instructions are executable to:
    provide a set of parameters to the log analyzer microservice, and
    receive an analysis result from the log analyzer microservice based on the set of parameters, wherein the analysis result is indicative of a filtered set of event log entries from the plurality of event log entries.

7. The system of claim 5, wherein the log analyzer microservice is configured to identify write changes in the event log.

8. The system of claim 1, wherein the instructions are executable to update the cloud infrastructure graph by at least one of adding a node to the cloud infrastructure graph or deleting a node from the cloud infrastructure graph.

9. The system of claim 8, wherein the scan result includes, for each particular change in the one or more changes, a first set of information on the particular change, and the instructions are executable to:
    run a data scan on the cloud environment that is constrained to infrastructure assets having an identified change in the one or more changes;
    obtain, from the data scan, a second set of information on each particular change in the one or more changes; and
    update the cloud infrastructure graph using the first set of information and the second set of information for each change.

10. The system of claim 9, wherein the instructions are executable to:
    run the data scan by executing an add/delete/update query only for entities that had a change identified in the one or more changes.

11. The system of claim 1, wherein the instructions are executable to:
    filter a set of risk signatures based on the one or more changes to obtain a filtered set of risk signatures; and
    apply the filtered set of risk signatures to the updated infrastructure graph to qualify one or more resources as vulnerable to breach attack.

12. The system of claim 11, wherein the instructions are executable to:
    filter the set of risk signatures based on comparing the one or more changes to tags assigned to the set of risk signatures, wherein the filtered set of risk signatures comprises some, but not all, of the set of risk signatures.

13. A computer-implemented method for analysis of infrastructure posture of a cloud environment, the computer-implemented method comprising:

detecting a triggering criterion corresponding to initiation of an update scan of the infrastructure posture of the cloud environment;

invoking an incremental change detector based on the triggering criterion, wherein invoking comprises:
  selecting a time period based on a previous scan of the infrastructure posture of the cloud environment;
  generating a scan parameter based on the time period;
  scanning an event log, having a plurality of event log entries that represent events in the cloud environment, based on the scan parameter;
  obtaining an analysis result indicative of a filtered set of event log entries from the plurality of event log entries; and
  returning a scan result that identifies one or more changes to a set of infrastructure assets in the cloud environment based on the analysis result; and updating a cloud infrastructure graph based on the one or more changes to the set of infrastructure assets, wherein the cloud infrastructure graph defines nodes that represent resources in the cloud environment and edges, between the nodes, that represent relationships between the resources.

14. The computer-implemented method of claim 13, wherein each change, of the one or more changes to the set of infrastructure assets, comprises at least one of:
  an infrastructure asset added to the set of infrastructure assets,
  an infrastructure asset deleted from the set of infrastructure assets, and
  an infrastructure asset changed in the set of infrastructure assets.

15. The computer-implemented method of claim 13, and further comprising at least one of:
  running a query on the cloud environment that is constrained based on the one or more changes; or
  filtering a set of risk signatures based on the one or more changes to obtain a filtered set of risk signatures and applying the filtered set of risk signatures to the infrastructure posture of the cloud environment.

16. A computing system comprising:
  an update trigger detector configured to detect a temporal criterion corresponding to initiation of an update scan of infrastructure posture of a cloud environment having a set of infrastructure assets;
  a cloud infrastructure detector configured to:
    access a cloud event log representing events with the cloud environment; and
    scan the cloud event log to identify one or more incremental changes to a set of cloud infrastructure assets within a time period identified based on the temporal criterion;
  a cloud infrastructure representation updater configured to update a representation of the infrastructure posture of the cloud environment based on the one or more incremental changes; and
  an action generator configured to perform one or more post processing actions relative to the set of cloud infrastructure assets based on the one or more incremental changes, wherein the one or more post processing actions comprise filtering a set of risk signatures based on the one or more incremental changes to obtain a filtered set of risk signatures, applying the filtered set of risk signatures to the infrastructure posture of the cloud environment, and generating a result that indicates one or more infrastructure assets in the set of infrastructure assets as conforming to at least one risk signature in the filtered set of risk signatures.

17. The computing system of claim 16, wherein the one or more post processing actions comprise at least one of:
  updating a portion of a cloud infrastructure graph based on the one or more incremental changes; or
  running a query on the cloud environment that is constrained based on the one or more incremental changes.

18. The computing system of claim 16, wherein each incremental change, of the one or more incremental changes, comprises at least one of:
  adding an infrastructure asset to the set of infrastructure assets,
  deleting an infrastructure asset from the set of infrastructure assets, and
  changing an infrastructure asset in the set of infrastructure assets.

* * * * *